United States Patent
Chen et al.

(10) Patent No.: US 9,503,209 B2
(45) Date of Patent: Nov. 22, 2016

(54) CELL ID MANAGEMENT FOR DISCOVERY REFERENCE SIGNALS FOR SMALL CELLS IN LTE

(71) Applicant: QUALCOMM Incorporated, San Diego, CA (US)

(72) Inventors: Wanshi Chen, San Diego, CA (US); Aleksandar Damnjanovic, Del Mar, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/656,589

(22) Filed: Mar. 12, 2015

(65) Prior Publication Data

US 2015/0326335 A1   Nov. 12, 2015

Related U.S. Application Data

(60) Provisional application No. 61/990,062, filed on May 7, 2014.

(51) Int. Cl.
*H04W 4/00* (2009.01)
*H04J 11/00* (2006.01)
(Continued)

(52) U.S. Cl.
CPC ........ *H04J 11/0079* (2013.01); *H04J 11/0073* (2013.01); *H04J 11/0076* (2013.01);
(Continued)

(58) Field of Classification Search
CPC ................ H04J 11/0079; H04J 11/0076; H04J 11/0073; H04W 48/20; H04W 48/16; H04L 5/0048
See application file for complete search history.

(56) References Cited

U.S. PATENT DOCUMENTS

2012/0208547 A1   8/2012   Geirhofer et al.
2012/0213109 A1*  8/2012   Xu ................. H04B 7/024
                                                    370/252
(Continued)

FOREIGN PATENT DOCUMENTS

KR   20120135871 A   12/2012

OTHER PUBLICATIONS

International Search Report and Written Opinion—PCT/US2015/020565—ISA/EPO—Jun. 16, 2015.
(Continued)

*Primary Examiner* — Clemens Han
(74) *Attorney, Agent, or Firm* — Arent Fox LLP

(57) ABSTRACT

Heterogeneous networks incorporate various small cells, such as femto cells and pico cells, in addition to a macro cell. Existing signals (e.g., PSS and SSS) configured as discovery reference signals (DRSs) may not be sufficient for a UE to discover different cells in a heterogeneous network. The disclosed aspects provide approaches for managing cell IDs for various DRS configurations to improve UE discovery of different cells in heterogeneous networks. In an aspect, a UE receives a first reference signal (e.g., based on a PCI) configured for performing a base station measurement by the UE. The UE further receives one or more second reference signals (e.g., based on a VCI which is associated with the PCI) configured for measurement by the UE. The UE performs the base station measurement based on the first reference signal and the one or more second reference signals.

33 Claims, 22 Drawing Sheets

(51) Int. Cl.
*H04L 5/00* (2006.01)
*H04W 48/20* (2009.01)
*H04W 48/16* (2009.01)

(52) U.S. Cl.
CPC ............ *H04L 5/0048* (2013.01); *H04W 48/20* (2013.01); *H04W 48/16* (2013.01)

(56) References Cited

U.S. PATENT DOCUMENTS

| | | | |
|---|---|---|---|
| 2012/0213261 A1 | 8/2012 | Sayana et al. | |
| 2013/0235821 A1* | 9/2013 | Chen ................. | H04W 72/0406 370/329 |
| 2013/0258886 A1 | 10/2013 | Chen et al. | |
| 2013/0315212 A1* | 11/2013 | Sorrentino .......... | H04W 72/082 370/336 |
| 2014/0043988 A1 | 2/2014 | Chen et al. | |
| 2014/0204853 A1 | 7/2014 | Ko et al. | |
| 2014/0233663 A1* | 8/2014 | Kang .................. | H04L 5/0037 375/260 |
| 2014/0348063 A1* | 11/2014 | Kang .................. | H04L 5/0048 370/328 |
| 2015/0092768 A1* | 4/2015 | Ng ....................... | H04W 48/16 370/350 |
| 2015/0195732 A1* | 7/2015 | Ouchi ................. | H04W 48/16 370/252 |
| 2015/0208259 A1* | 7/2015 | Ouchi ................. | H04W 48/16 370/252 |
| 2015/0270936 A1* | 9/2015 | Han ..................... | H04L 5/0048 370/329 |
| 2015/0312905 A1* | 10/2015 | Seo ..................... | H04B 7/2656 370/280 |
| 2015/0358899 A1* | 12/2015 | Ko ....................... | H04W 48/16 370/252 |

OTHER PUBLICATIONS

Nokia Corporation: et al.. "Small Cell Enhancements and cell detection", 3GPP Draft; R4-142253, 3rd Generation Partnership Project (3GPP), Mobile Competence Centre; 650, Route Des Lucioles; F-06921 Sophia-Antipolis Cedex; France vol. RAN WG4, No. San Jose; Mar. 31, 2014-Apr. 4, 2014 Mar. 31, 2014 (Mar. 31, 2014), XP050797297, Retrieved from the Internet: URL:http://www.3gpp.org/ftp/Meetings3GPPSYNC/RAN4/Docs/—[retrieved on Mar. 31, 2014] paragraph [02.2].

Nokia Corporation: et al., "On semi-static parameter signalling and blind detection in NAICS", 3GPP Draft; R4-142169, 3rd Generation Partnership Project (3GPP), Mobile Competence Centre; 650, Route Des Lucioles; F-06921 Sophia-Antipolis Cedex; France vol. RAN WG4, No. San Jose Del Cabo, Mexico; Mar. 31, 2014-Apr. 4, 2014 Mar. 31, 2014 (Mar. 31, 2014). XP050797230, Retrieved from the Internet: URL:http://www.3gpp.org/ftp/Meetings3GPPSYNC/RAN4/Docs/—[retrieved on Mar. 31, 2014] Paragraph 2.

\* cited by examiner

CELL ID MANAGEMENT FOR DISCOVERY REFERENCE SIGNALS FOR SMALL CELLS IN LTE

CROSS-REFERENCE TO RELATED APPLICATION(S)

This application claims the benefit of U.S. Provisional Application Ser. No. 61/990,062,entitled "CELL ID MANAGEMENT FOR DISCOVERY REFERENCE SIGNALS FOR SMALL CELLS IN LTE" and filed on May 7, 2014, which is expressly incorporated by reference herein in its entirety.

BACKGROUND

1. Field

The present disclosure relates generally to communication systems, and more particularly, to cell ID management related to discovery reference signals from small cells in LTE.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of a telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

Heterogeneous networks incorporate various small cells, such as femto cells and pico cells, in addition to macro cells. An existing primary synchronization signal (PSS) and secondary synchronization signal (SSS) may be configured by a cell (e.g., also referred to as a base station) along with a cell-specific reference signal (CRS) and/or channel state information reference signal (CSI-RS) to serve as discovery reference signals. However, such existing signals may not be sufficient. For example, under synchronous deployment, PSS and/or SSS of different cells may collide with each other. As such, the number of cells that may be detected/discovered by a UE using PSS and/or SSS may be limited. As another example, CRS has limited reuse (e.g., up to 1/6 reuse factor) and may not provide transmission point (TP) identification for some Coordinated Multipoint (CoMP) transmission scenarios. Since CRS depends on a physical cell identifier (PCI), CRS cannot provide TP identification among the macro cell and its associated cells. The disclosed aspects provide approaches for managing cell identifiers (IDs) for various Discovery Reference Signal (DRS) configurations to improve UE discovery of different cells in heterogeneous networks.

In an aspect of the disclosure, a method, a computer program product, and an apparatus are provided. For example, the apparatus may be a UE. The UE receives a first reference signal configured for performing a base station measurement by the UE, where the first reference signal is based on a PCI. The UE further receives one or more second reference signals configured for measurement by the UE, where each one of the one or more second reference signals is based on a virtual cell identifier (VCI) which is associated with the PCI. The UE performs the base station measurement based on the first reference signal and the one or more second reference signals.

In an aspect of the disclosure, a method, a computer program product, and an apparatus are provided. For example, the apparatus may be a base station. The base station generates a first reference signal configured to enable a base station measurement by at least one UE, where the first reference signal is based on a PCI. The base station further generates one or more second reference signals configured to enable measurement by the at least one UE, where each one of the one or more second reference signals is based on a VCI which is associated with the PCI. The base station transmits the first reference signal and the one or more second reference signals.

DETAILED DESCRIPTION

Figure 1:
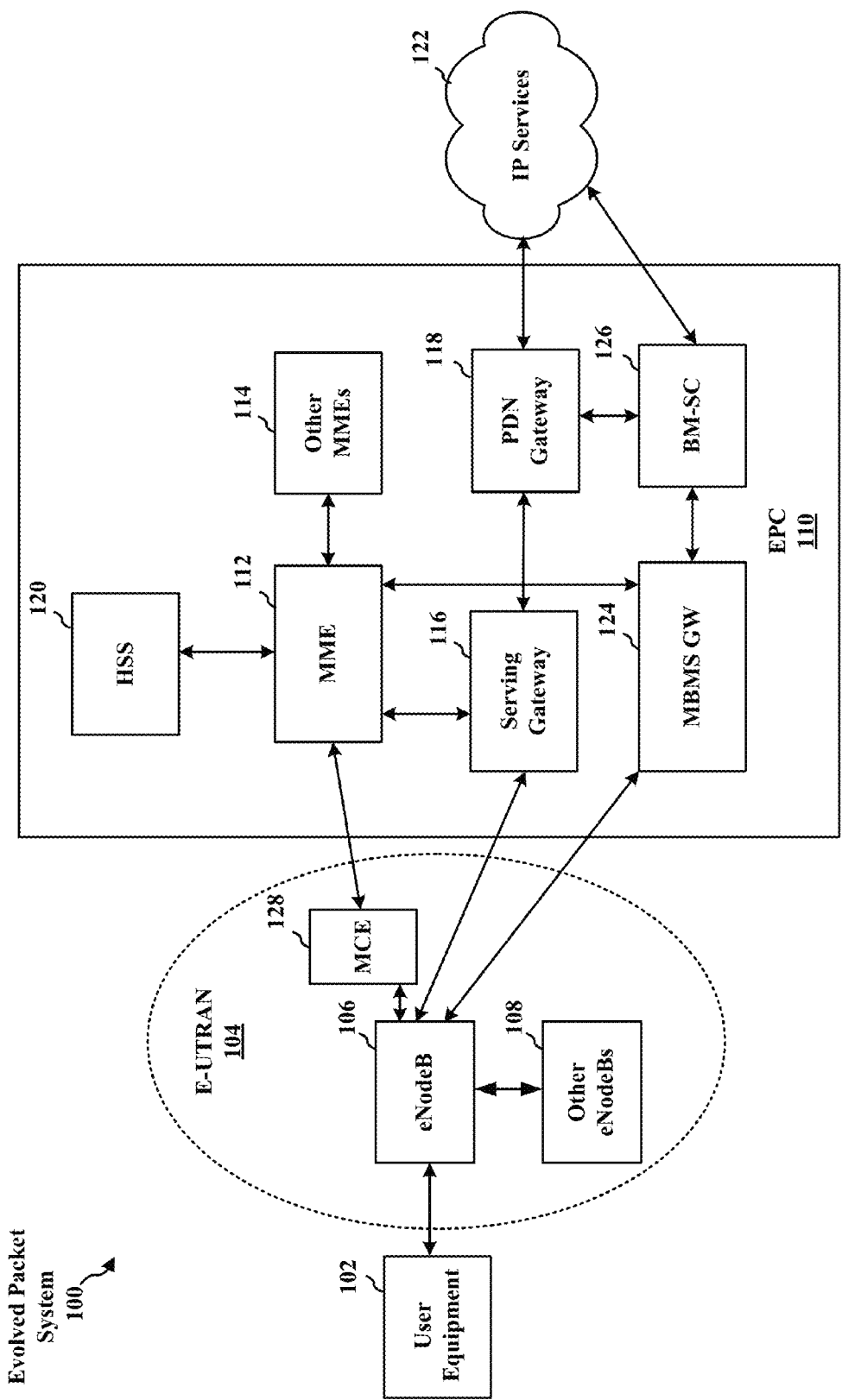
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108, and may include a Multicast Coordination Entity (MCE) 128. The eNB 106 provides user and control planes protocol terminations toward the UE 102. The eNB 106 may be connected to the other eNBs 108 via a backhaul (e.g., an X2 interface). The MCE 128 allocates time/frequency radio resources for evolved Multimedia Broadcast Multicast Service (MBMS) (eMBMS), and determines the radio configuration (e.g., a modulation and coding scheme (MCS)) for the eMBMS. The MCE 128 may be a separate entity or part of the eNB 106. The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 may include a Mobility Management Entity (MME) 112, a Home Subscriber Server (HSS) 120, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 and the BM-SC 126 are connected to the IP Services 122. The IP Services 122 may include the Internet, an intranet, an IP Multimedia Subsystem (IMS), a PS Streaming Service (PSS), and/or other IP services. The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

Figure 2:
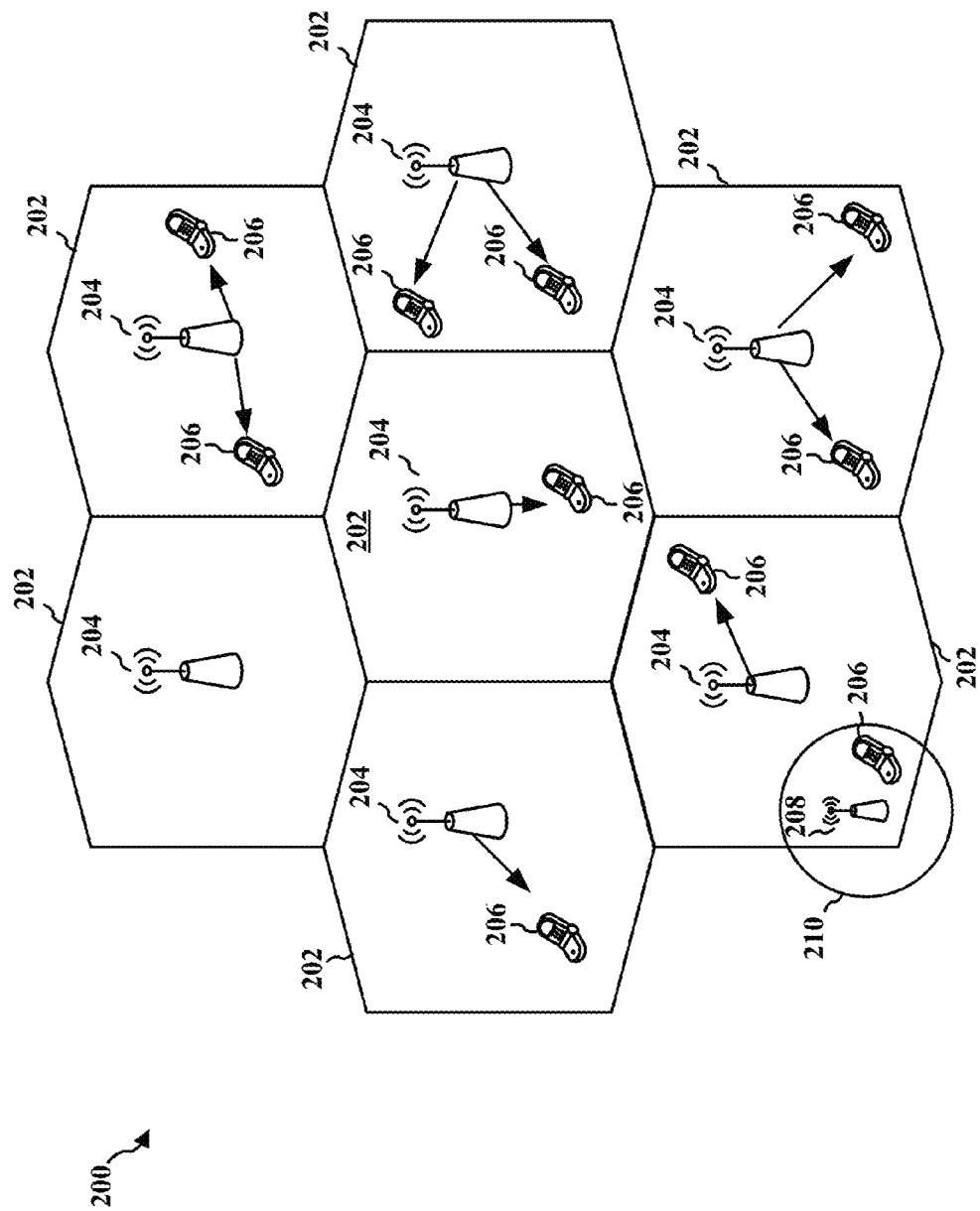
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sectors). The term "cell" can refer to the smallest coverage area of an eNB and/or an eNB subsystem serving are particular coverage area. Further, the terms "eNB," "base station," and "cell" may be used interchangeably herein.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20,and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE. 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
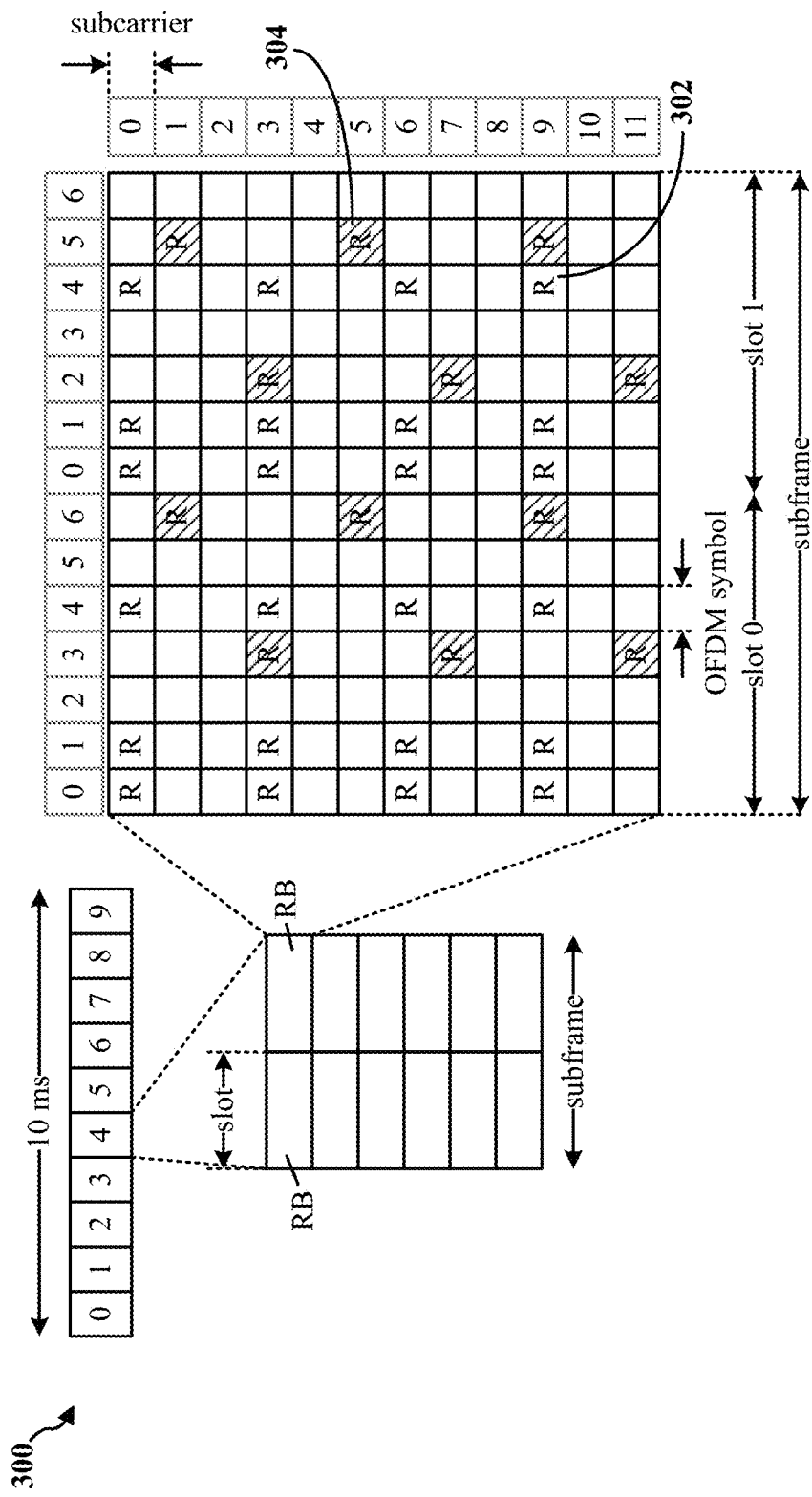
FIG. 3 is a diagram illustrating an example of a DL frame structure in LTE.

FIG. 3 is a diagram 300 illustrating an example of a DL frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, for a normal cyclic prefix, a resource block contains 12 consecutive subcarriers in the frequency domain and 7 consecutive OFDM symbols in the time domain, for a total of 84 resource elements. For an extended cyclic prefix, a resource block contains 12 consecutive subcarriers in the frequency domain and 6 consecutive OFDM symbols in the time domain, for a total of 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
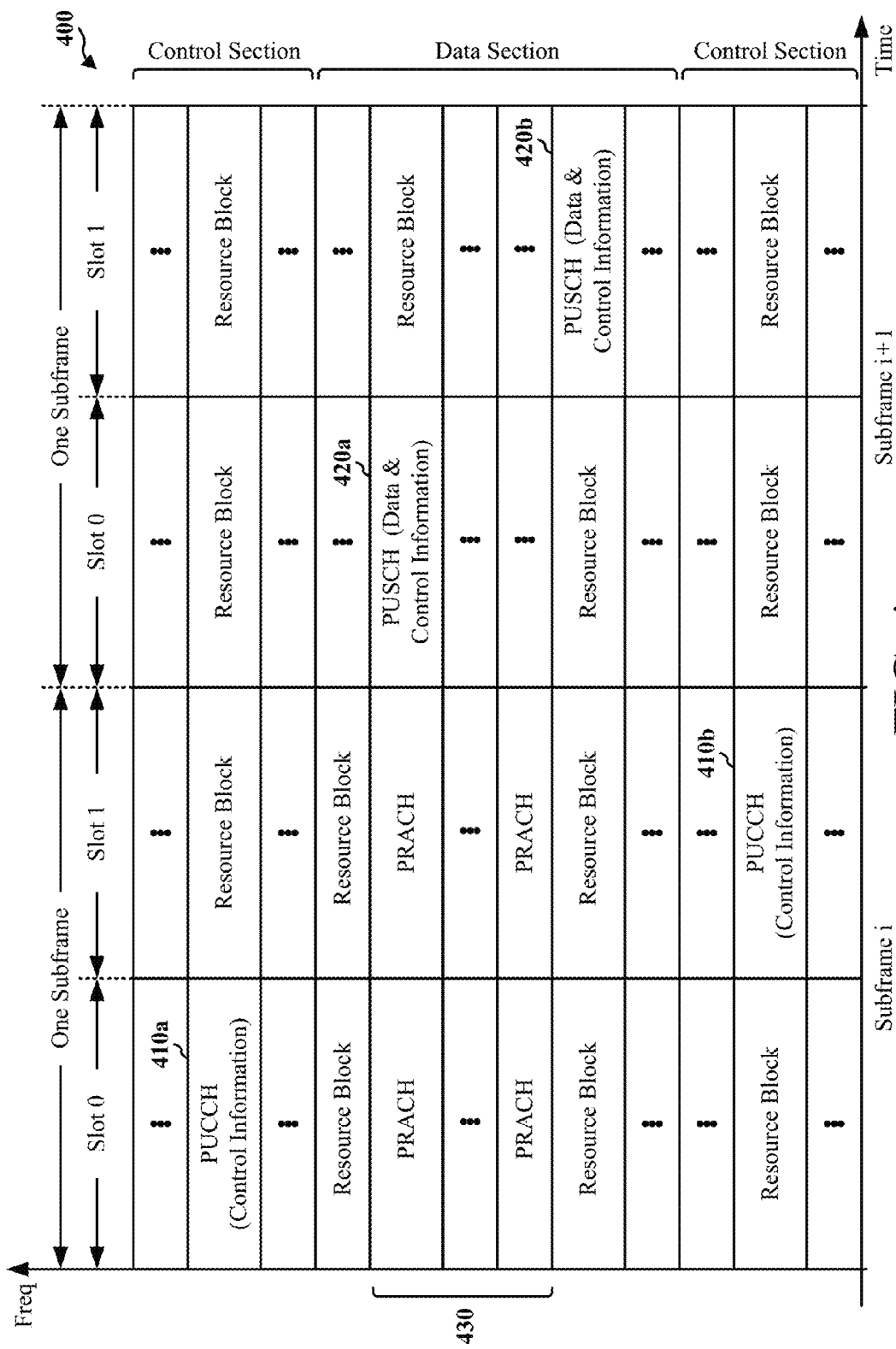
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a,410b in the control section to transmit control information to an eNB. The UE may also be assigned resource blocks 420a,420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
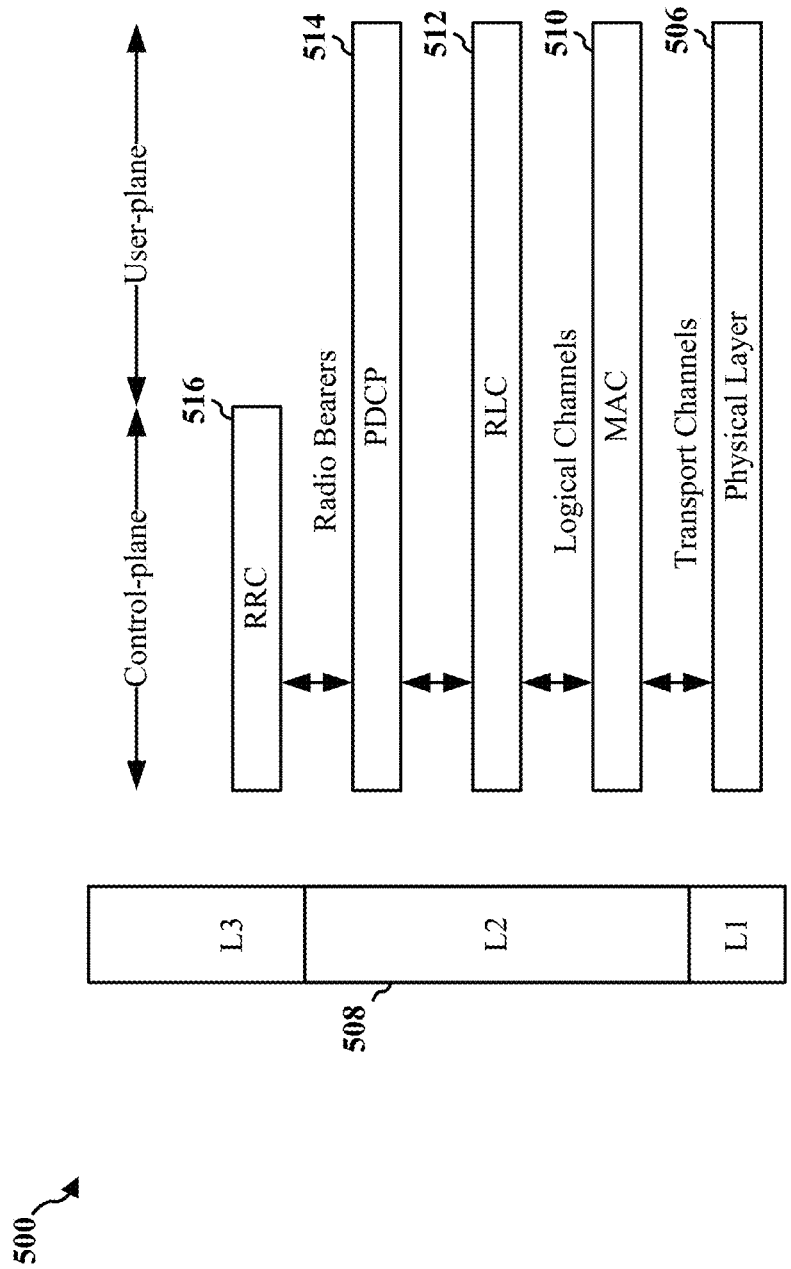
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1,Layer 2,and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
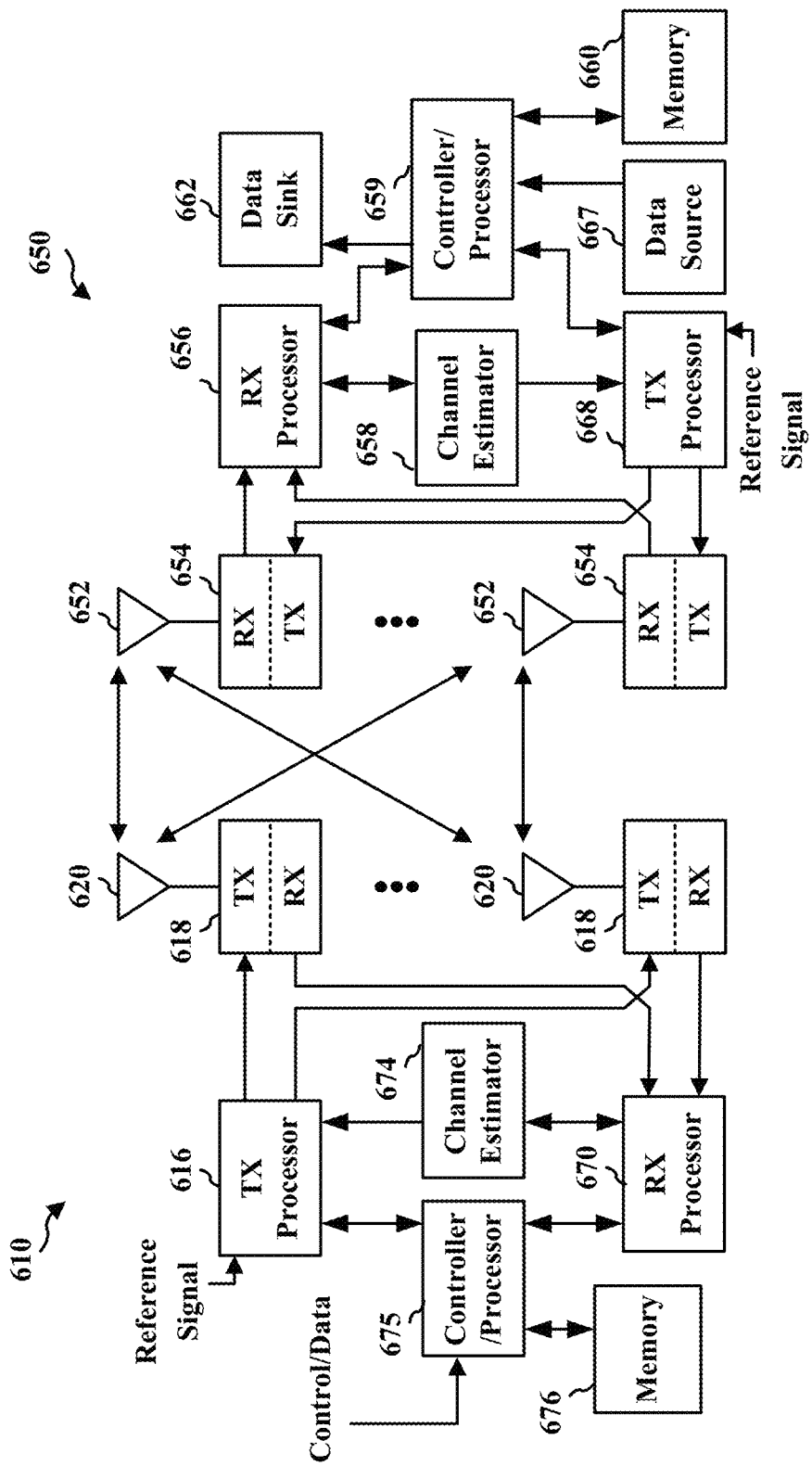
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

In order to improve network (e.g., an LTE network) performance, the number of proximate small cells within an area may be increased. For example, in a macro area, many small cells may be deployed to boost the capacity and bandwidth of the network. To more efficiently manage such small cells, various downlink interference avoidance/coordination methods may be implemented by the network. In an aspect, small cell discontinuous transmission (DTX), carrier selection, enhanced inter-cell interference coordination (eI-CIC), downlink power adaptation, and/or cell selection/association enhancements may be implemented by the network. When implementing small cell DTX, for example, instead of transmitting in all subframes, a small cell may discontinue its transmission if it is deemed beneficial. When implementing carrier selection, for example, the network may select a different carrier. In an aspect, a UE may need to rely on discovery signals to discover its surrounding cells. Accordingly, such discovery signals may facilitate small cell management. Moreover, discovery signals may enable load balancing and interference coordination (including on/off operation), autonomous configuration of a new small cell, and/or mobility robustness.

Figure 7:
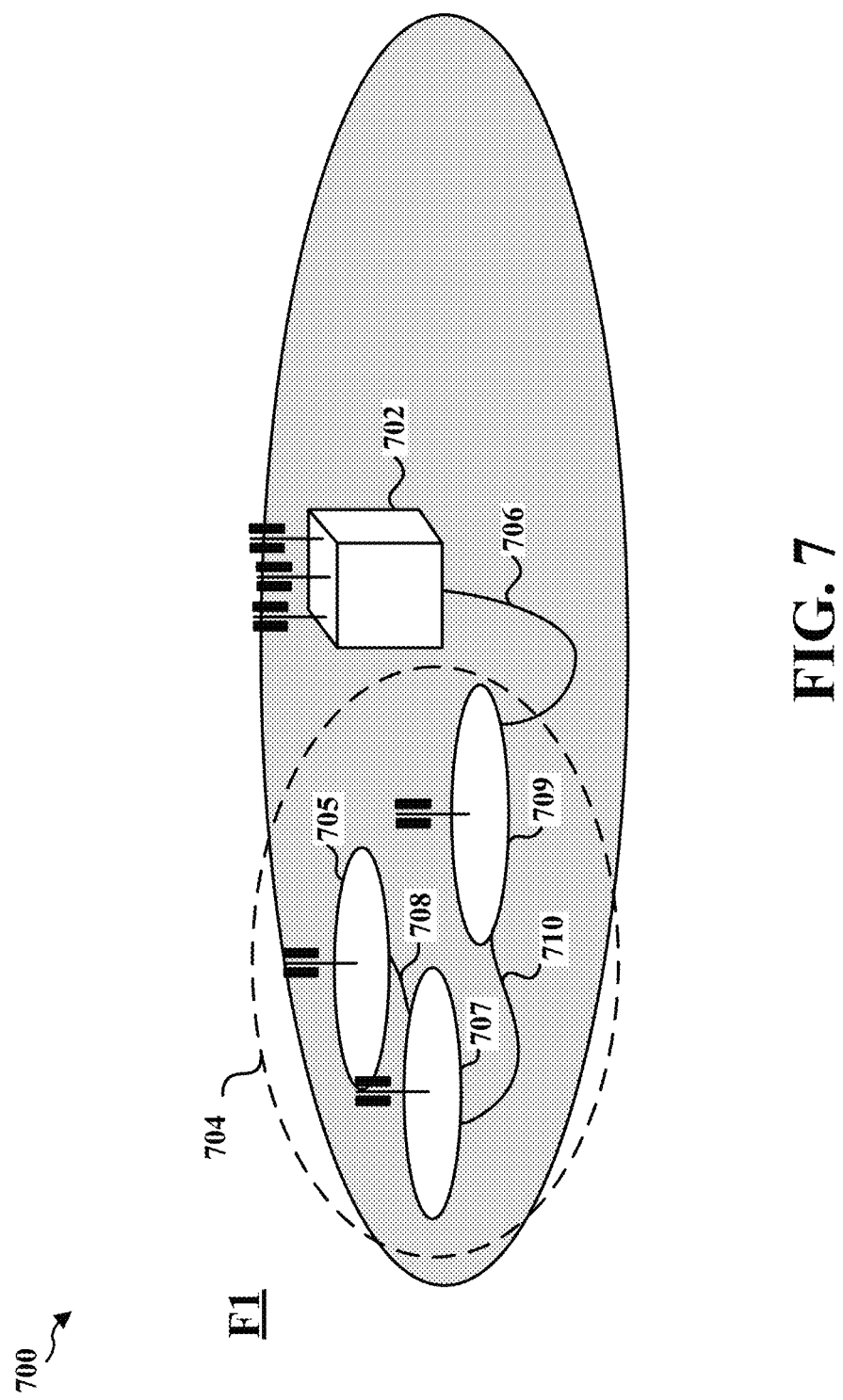
FIG. 7 is a diagram illustrating an example small cell deployment configuration.

FIG. 7 is a diagram 700 illustrating an example small cell deployment configuration with respect to both frequency and geography. FIG. 7 shows an outdoor deployment of a macro cell 702 and small cells 704. In an aspect, the small cells 704 may include cell 1 705, cell 2 707, and cell 3 709. In FIG. 7, the small cells 704 are coupled to one another through backhaul links 708 and 710. Furthermore, the small cells 704 are coupled to the macro cell 702 thorough backhaul link 706. In the configuration of FIG. 7, the macro cell 702 and small cells 704 share a frequency band (e.g., frequency band F1).

Figure 8:
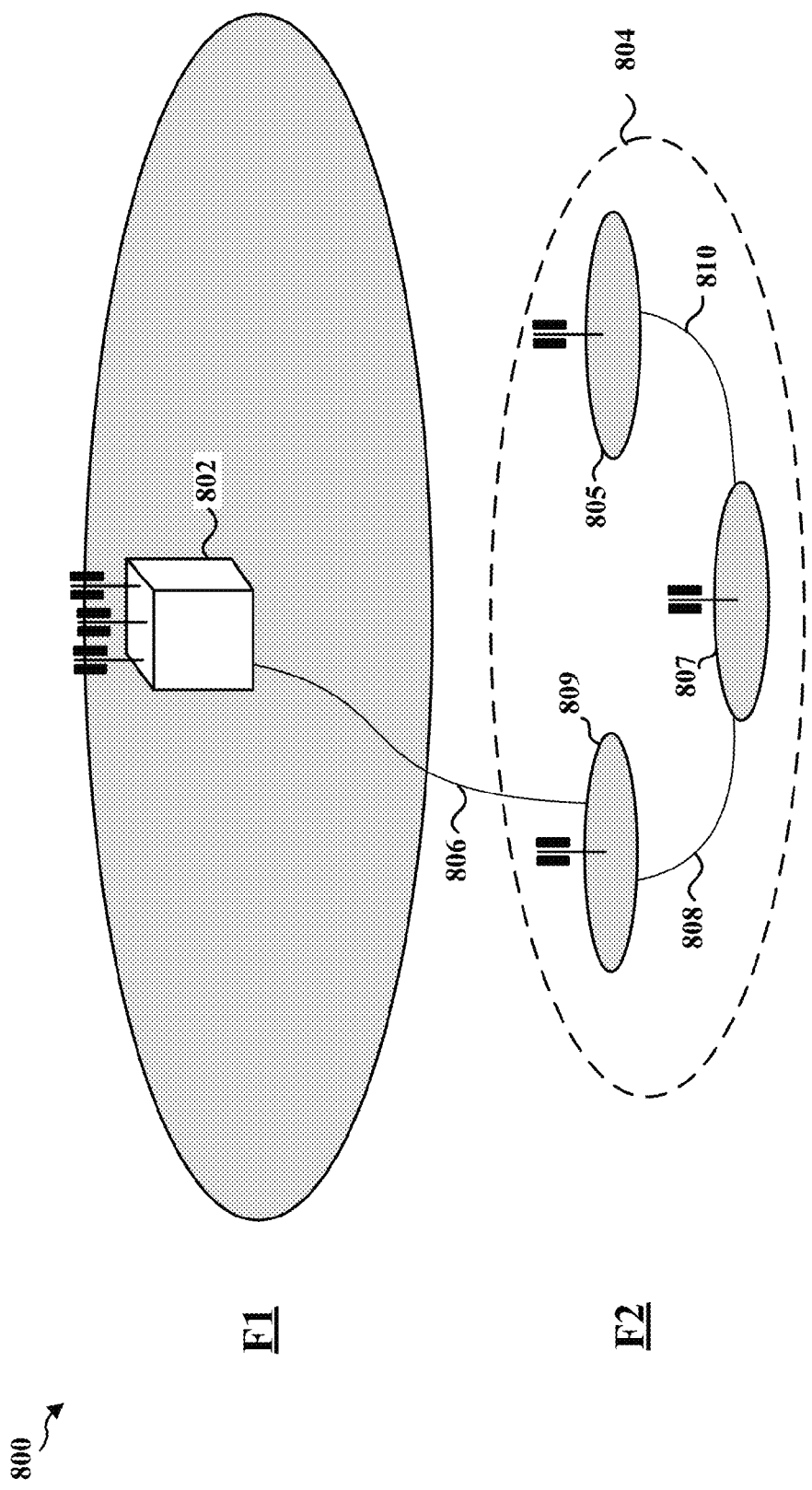
FIG. 8 is a diagram illustrating an example small cell deployment configuration.

FIG. 8 is a diagram 800 illustrating an example small cell deployment configuration. FIG. 8 shows an outdoor deployment of a macro cell 802 and small cells 804. In an aspect, the small cells 804 may include cell 1 805, cell 2 807, and cell 3 809. In FIG. 8, the small cells 804 are coupled to one another through backhaul links 808 and 810. Furthermore, the small cells 804 are coupled to the macro cell 802 thorough backhaul link 806. The macro cell 802 and small cells 804 may overlap geographically. In the configuration of FIG. 8, the macro cell 802 uses a first frequency band (e.g., frequency band F1) and the small cells 804 use a second frequency band (e.g., frequency band F2) different from the first frequency band.

Figure 9:
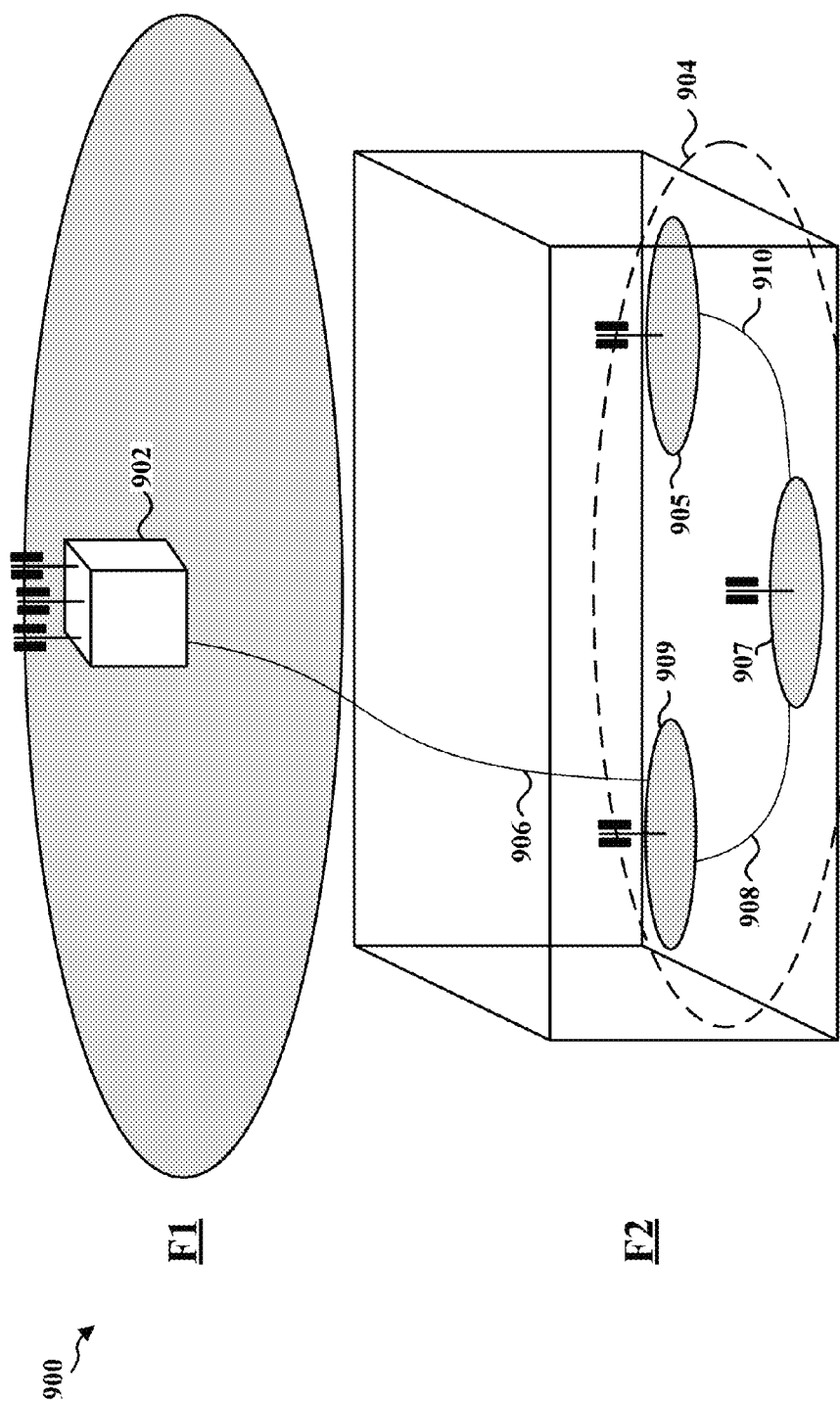
FIG. 9 is a diagram illustrating an example small cell deployment configuration.

FIG. 9 is a diagram 900 illustrating an example small cell deployment configuration, similarly to FIG. 8. FIG. 9 shows a macro cell 902 that is deployed outdoors and small cells 904 that are deployed indoors. In an aspect, the small cells 904 may include cell 1 905, cell 2 907, and cell 3 909. In FIG. 9, the small cells 904 are coupled to one another through backhaul links 908 and 910. Furthermore, the small cells 904 are coupled to the macro cell 902 thorough backhaul link 906. In the configuration of FIG. 9, the macro cell 902 uses a first frequency band (e.g., frequency band F1) and the small cells 904 use a second frequency band (e.g., frequency band F2) different from the first frequency band.

Figure 10:
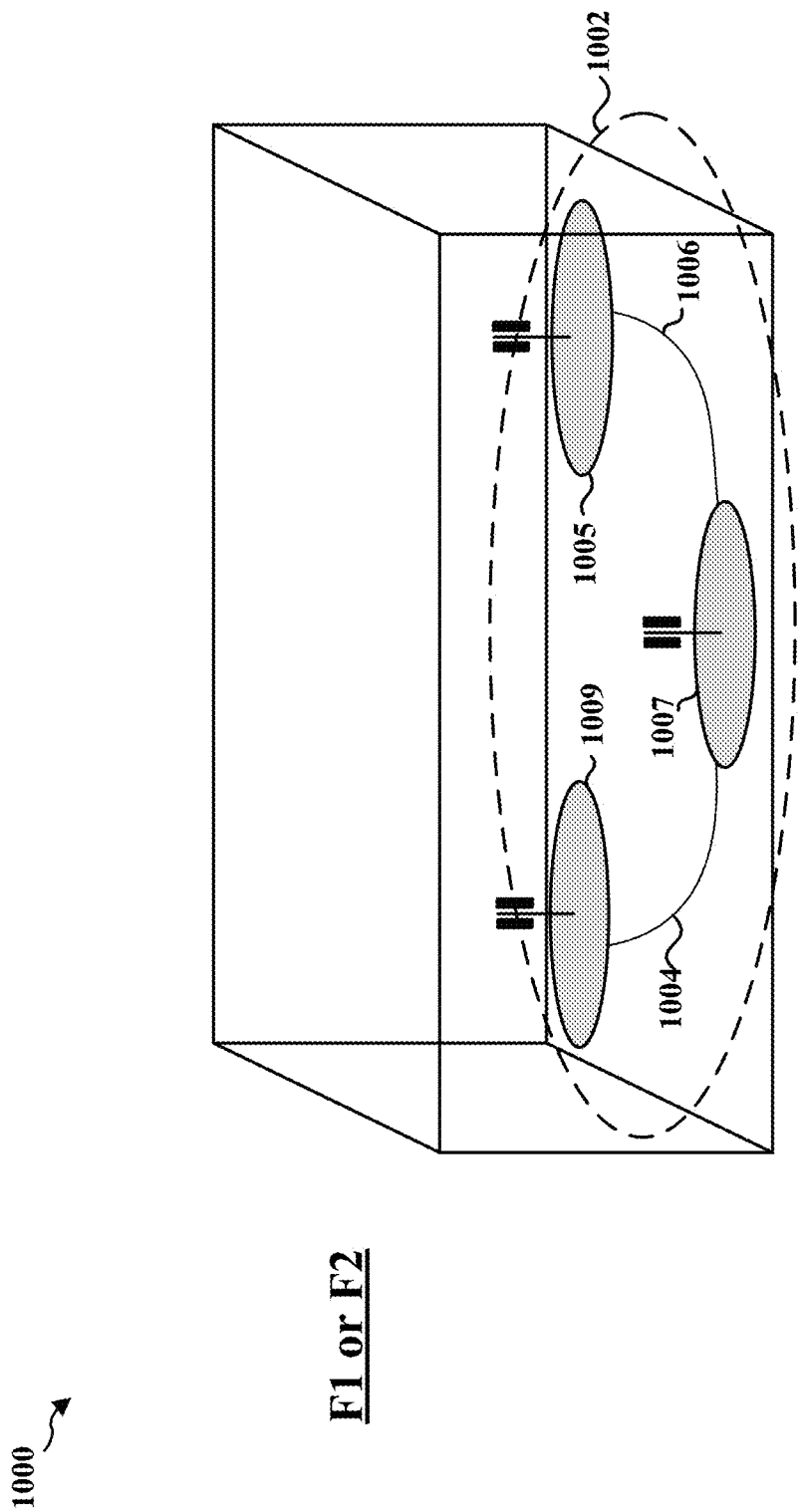
FIG. 10 is a diagram illustrating an example small cell deployment configuration.

FIG. 10 is a diagram 1000 illustrating an example small cell deployment configuration. FIG. 10 shows small cells 1002 that are deployed indoors. In an aspect, the small cells 1002 may include cell 1 1005, cell 2 1007, and cell 3 1009. In FIG. 10, the small cells 1002 are coupled to one another through backhaul links 1004 and 1006. In the configuration of FIG. 10, the small cells 1002 use either a first frequency band (e.g., frequency band F1) or a second frequency band (e.g., frequency band F2). In the configurations of FIGS. 7 through 10, the users may be distributed both for outdoor and indoor deployments.

An existing primary synchronization signal (PSS), secondary synchronization signal (SSS), and/or CRS may be configured by a cell (e.g., also referred to as a base station) to serve as discovery signals. However, such existing signals may not be sufficient. Under synchronous deployment, PSS and/or SSS of different cells may collide with each other. The number of cells that may be detected/discovered by a UE may be limited. PSS and/or SSS interference cancellation may be used to facilitate discovering more cells, and is generally deemed as sufficient. CRS has limited reuse (e.g., up to 1/6 reuse factor) and may not provide transmission point (TP) identification for some coordinated multipoint (CoMP) transmission scenarios. For example, in CoMP scenario 4, a macro cell and its associated small cells may have the same physical cell ID (PCI). Since CRS depends on PCI, CRS cannot provide TP identification among the macro cell and its associated cells.

In an aspect, discovery reference signal (DRSs) may be configured to identify a transmission point and/or facilitate small cell on/off. In an aspect, DRSs transmitted from a cell may include both a PSS and an SSS. In other aspects, the DRSs may further include a CRS and/or a channel state information reference signal (CSI-RS).

In an aspect, a cell may configure a PSS, SSS, and/or CRS to serve as a DRS for the cell. In one aspect, the PSS, SSS, and CRS may all be based on a virtual cell ID (VCI) associated with the cell, which may enable cell identification by a UE. In an aspect, the VCI may be separately managed from the PCI of the cell. In an aspect, the PSS, SSS, and CRS may all be based on the VCI regardless of the cell's state (e.g., ON state or OFF state). It should be noted that the PSS, SSS, and/or CRS configured to serve as a DRS for a cell may be different from a PSS, SSS, and/or CRS based on a PCI.

In another aspect, a cell may configure a CRS to serve as a DRS for the cell. In one aspect, the CRS may be based on a VCI associated with the cell, which may enable cell identification by a UE. In an aspect, the VCI may be separately managed from the PCI of the cell. In such aspect, the PSS and/or SSS may still be based on the PCI of the cell. In an aspect, the CRS may be based on the VCI regardless of the cell's state (e.g., ON state or OFF state). In an aspect, a mapping between the PCI (identified via PSS/SSS) and the VCI (in CRS) may be either explicitly indicated in a signal sent to the UE or implicitly defined at the UE. For example, the signal sent to the UE may indicate an association between a PCI and one or more VCIs. As another example, the implicit definition may be a pre-defined mapping rule stored at the UE. In such example, a UE may determine possible VCIs associated with a PCI using the following mapping rule: {PCI−3,PCI−2,PCI−1,PCI, PCI+1,PCI+2,PCI+3}. For example, such mapping rule may be subject to a range from 0 to 503 possible values.

In an aspect, a cell may configure a PSS, SSS, and/or CSI-RS to serve as a DRS for the cell, where the PSS, SSS, and CRS are all based on a PCI associated with the cell. In such aspect, the cell identification may be turned off at least for some CoMP scenarios. It should be noted that two or more of the previously described aspects may be supported and configurable for a UE by a cell. Different UEs may be configured to use a same DRS or different DRSs for measurement.

In an aspect, a cell may configure a PSS, SSS, and/or CSI-RS to serve as a DRS for the cell. In one aspect, the PSS, SSS, and CSI-RS may all be based on a virtual cell ID (VCI) associated with the cell, which may enable cell identification by a UE. In an aspect, the VCI may be separately managed from the PCI of the cell. In an aspect, the PSS, SSS, and CSI-RS may all be based on the VCI regardless of the cell's state (e.g., ON state or OFF state). It should be noted that the PSS, SSS, and/or CSI-RS configured to serve as a DRS for a cell may be different from a PSS, SSS, and/or CSI-RS based on a PCI.

In another aspect, a cell may configure a CSI-RS to serve as a DRS for the cell. In one aspect, the CSI-RS may be based on a VCI associated with the cell, which may enable cell identification by a UE. In an aspect, the VCI may be separately managed from the PCI of the cell. In such aspect, the PSS and/or SSS may still be based on the PCI of the cell. In an aspect, the CSI-RS may be based on the VCI regardless of the cell's state (e.g., ON state or OFF state). In an aspect, a mapping between the PCI (identified via PSS/SSS) and the VCI (in CSI-RS) may be either explicitly indicated in a signal sent to the UE or implicitly defined at the UE. For example, the signal sent to the UE may indicate an association between a PCI and one or more VCIs. As another example, the implicit definition may be a pre-defined mapping rule stored at the UE. In such example, a UE may determine possible VCIs associated with a PCI using the following mapping rule: {PCI−3,PCI−2,PCI−1,PCI, PCI+1,PCI+2,PCI+3}. For example, such mapping rule may be subject to a range from 0 to 503 possible values.

In an aspect, a cell may configure a PSS, SSS, and/or CSI-RS to serve as a DRS for the cell, where the PSS, SSS, and CSI-RS are all be based on a PCI associated with the cell. In such aspect, the cell identification may be turned off at least for some CoMP scenarios. It should be noted that two or more of the previously described aspects may be supported and configurable for a UE by a cell. Different UEs may be configured to use a same DRS or different DRSs for measurement.

In an aspect, a cell may configure a PSS, SSS, CRS, and/or CSI-RS to serve as a DRS for the cell. In one aspect, the PSS, SSS, CRS, and CSI-RS may all be based on a VCI associated with the cell, which may enable cell identification by a UE. In an aspect, the VCI may be separately managed from the PCI of the cell. In an aspect, the PSS, SSS, CRS, and CSI-RS may all be based on the VCI regardless of the cell's state (e.g., ON state or OFF state). It should be noted that the PSS, SSS, CRS, and/or CSI-RS configured to serve as a DRS for a cell may be different from a PSS, SSS, CRS, and/or CSI-RS based on a PCI.

In another aspect, a cell may configure a CSI-RS to serve as a DRS for the cell. In one aspect, the CSI-RS may be based on a VCI associated with the cell, which may enable cell identification by a UE. In an aspect, the VCI may be separately managed from the PCI of the cell. In such aspect, the PSS, SSS, and/or CRS may still be based on the PCI of the cell. In an aspect, the CSI-RS may be based on the VCI regardless of the cell's state (e.g., ON state or OFF state). In an aspect, a mapping between the PCI (identified via PSS/SSS/CRS) and the VCI (in CSI-RS) may be either explicitly indicated in a signal sent to the UE or implicitly defined at the UE. For example, the signal sent to the UE may indicate an association between a PCI and one or more VCIs. As another example, the implicit definition may be a pre-defined mapping rule stored at the UE. In such example, a UE may determine possible VCIs associated with a PCI using the following mapping rule: {PCI−3,PCI−2,PCI−1, PCI, PCI+1,PCI+2,PCI+3}. For example, such mapping rule may be subject to a range from 0 to 503 possible values.

In another aspect, a cell may configure a CSI-RS and/or a CRS to serve as a DRS for the cell. In one aspect, the CSI-RS and/or CRS may be based on a VCI associated with the cell, which may enable cell identification by a UE. In an aspect, the VCI may be separately managed from the PCI of the cell. In such aspect, the PSS and/or SSS may still be based on the PCI of the cell. In an aspect, the CSI-RS and/or CRS may be based on the VCI regardless of the cell's state (e.g., ON state or OFF state). In an aspect, a mapping between the PCI (identified via PSS/SSS) and the VCI (in CSI-RS and/or CRS) may be either explicitly indicated in a signal sent to the UE or implicitly defined at the UE. For example, the signal sent to the UE may indicate an association between a PCI and one or more VCIs. As another example, the implicit definition may be a pre-defined mapping rule stored at the UE. In such example, a UE may determine possible VCIs associated with a PCI using the following mapping rule: {PCI−3,PCI−2,PCI−1,PCI, PCI+1, PCI+2,PCI+3}. For example, such mapping rule may be subject to a range from 0 to 503 possible values.

In an aspect, a cell may configure a PSS, SSS, CRS, and/or CSI-RS to serve as a DRS for the cell, where the PSS, SSS, CRS, and/or CSI-RS are all be based on a PCI associated with the cell. In such aspect, the cell identification may be turned off at least for some CoMP scenarios. It should be noted that two or more of the previously described aspects may be supported and configurable for a UE by a cell. Different UEs may be configured to use a same DRS or different DRSs for measurement.

In an aspect, when a cell configures a PSS, SSS, CRS, and/or CSI-RS to serve as a DRS, the periodicity of CRS may be configured to be different from the periodicity of the CSI-RS in the OFF and ON states of the cell. Radio resource management (RRM) measurements on CSI-RS may be configured separately. In an aspect, a UE may report a reference signal received power (RSRP) and/or a reference signal received quality (RSRQ) based on the PSS, SSS, and/or CRS. In another aspect, a UE may report an RSRP and/or an RSRQ based on CSI-RS. In an aspect, a UE may be configured to only send channel state information (CSI) feedback based on CSI-RS and to not report RSRP and/or RSRQ.

In an aspect, cell ID management may be independent of the state (e.g., ON state or OFF state) of a cell. In another aspect, cell ID management and/or DRS may depend on a state of the cell. For example, if the cell is in an OFF state, DRS may be transmitted based on a VCI corresponding to the cell. Alternatively, if the cell is in an ON state, DRS may be transmitted based on a PCI of the cell. For example, if the cell is in an OFF state, PSS/SSS/CRS may be used as DRS for the cell while if the cell is in an ON state, PSS/SSS/CSI-RS may be used as DRS for the cell.

In an aspect, when a cell configures a CSI-RS to serve as a DRS, a single configuration for CSI-RS may be used. Alternatively, two or more configurations for CSI-RS may be used, where each configuration may have its own cell ID management. In an aspect, a UE may jointly report an RSRP, RSRQ, and/or CSI based on the two or more configurations of the CSI-RS when the two or more configurations involve the same cell identifier or may separately report the RSRP, RSRQ, and/or CSI based on the two or more configurations of the CSI-RS when the two or more configurations involve different cell identifiers.

In an aspect, a UE may measure RSSI in a subframe different from the DRS subframes. For example, a UE may measure RSSI in a subframe immediately preceding the DRS subframe. In another aspect, if DRS is narrowband, the UE may measure RSSI in subbands different from the DRS subbands in the same subframe. In an aspect, a UE may receive an indication of which subframe and/or which subbands to be used for RSSI measurement for RSRQ reporting.

In an aspect, the subframes for RSRQ measurement for a cell in an OFF state may be the same subframes for the cell in an ON state. Alternatively, if the state of the cell (e.g., ON state or OFF state) is indicated to the UE, different subframes and/or mechanisms (e.g., OFF state based on DRS, and ON state based on CRS) may be used for ON and OFF states for a cell.

Figure 11A:
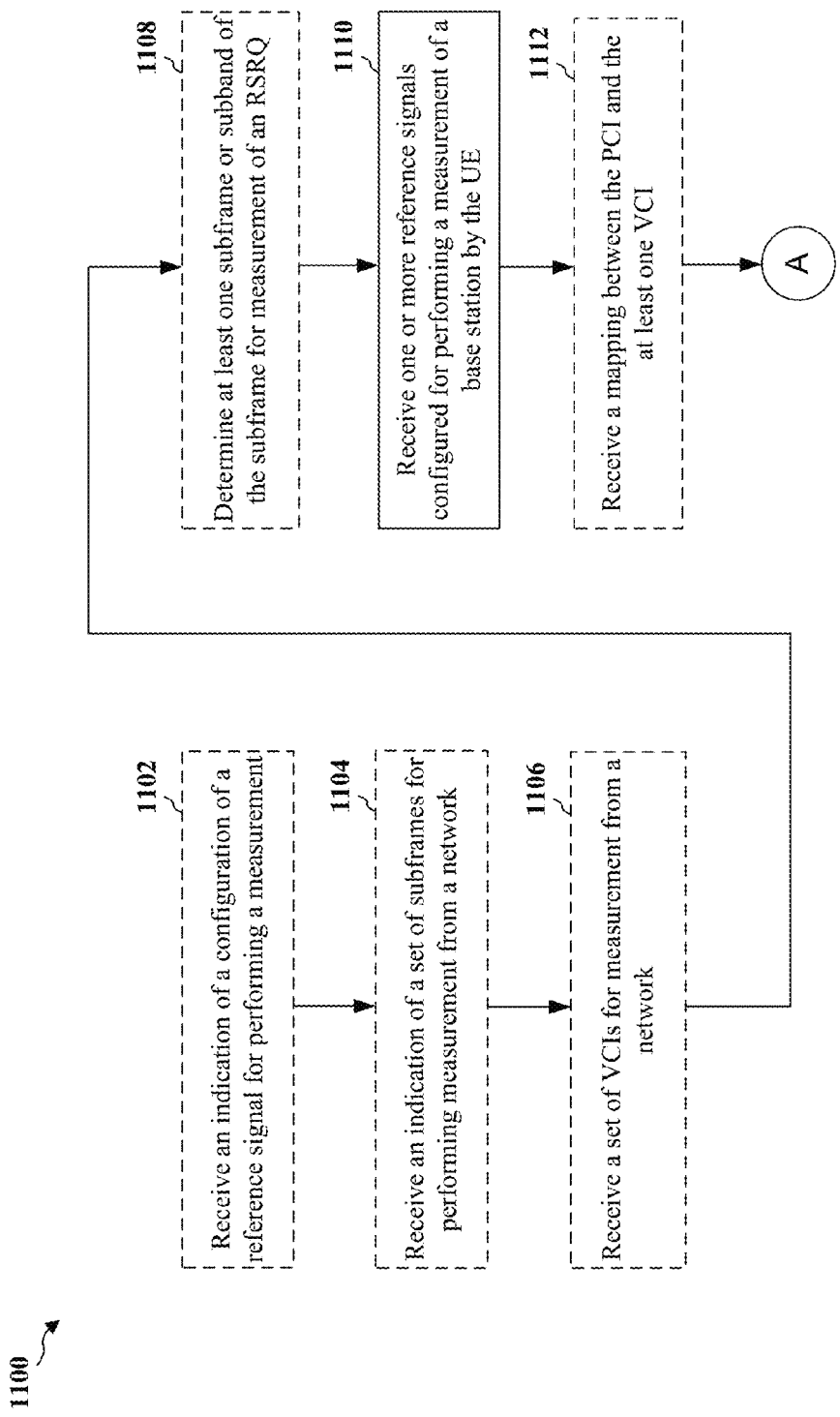
FIGS. 11A and 11B are a flow chart of a method of wireless communication.
Figure 11B:
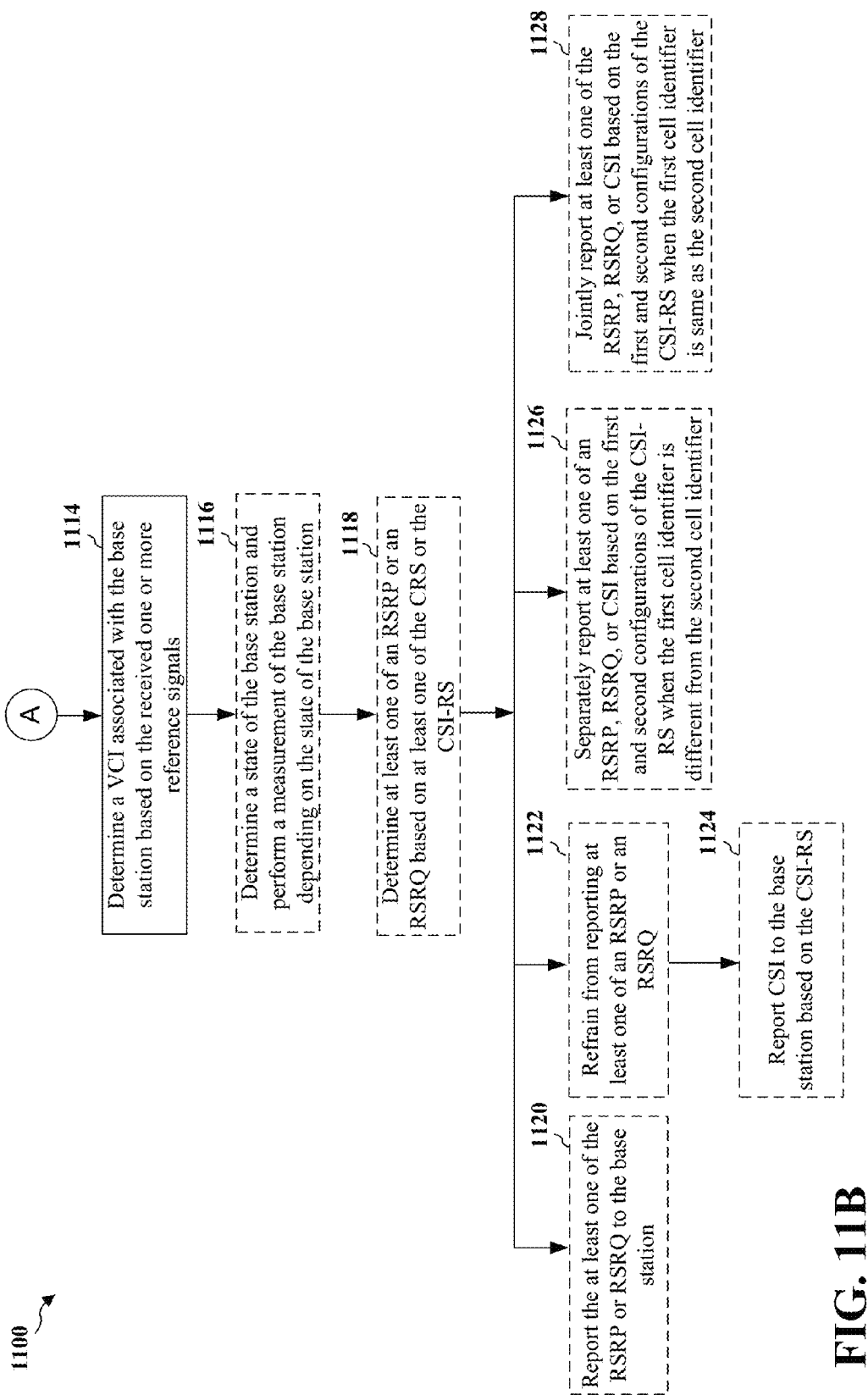

FIGS. 11A and 11B are a flow chart 1100 of a method of wireless communication. The method may be performed by a UE (e.g., the apparatus 1302/1302'). It should be understood that the steps indicated by dashed lines in flow chart 1100 represent optional steps.

At step 1102, the UE receives an indication of a configuration of a reference signal for performing a measurement.

At step 1104, the UE receives an indication of a set of subframes for performing measurement from a network (e.g., a cell or base station).

At step 1106, the UE receives a set of VCIs for measurement from a network.

At step 1108, the UE determines at least one subframe or subband of the subframe for measurement of an RSRQ. In an aspect, the at least one subframe or subband of the subframe does not include the one or more reference signals configured for the discovery. For example, the determination of the at least one subframe or subband of the subframe may be based on a signaling from a network. In an aspect, the measurement of the RSRQ by the UE includes measuring an RSSI in the at least one subframe or subband of the subframe determined by the UE.

At step 1110, the UE receives one or more reference signals configured for performing a measurement of a base station by the UE. In an aspect, the one or more reference signals are received when the base station is in an OFF state or an ON state.

In an aspect, the reference signals may include a PSS, SSS, and/or CRS. In an aspect, the PSS, SSS, and/or CRS may correspond to a VCI associated with the base station. In another aspect, the PSS and the SSS may correspond to a PCI associated with the base station, and the CRS in combination with the PCI may correspond to at least one VCI.

In another aspect, the reference signals may include a PSS, SSS, and/or CSI-RS. In an aspect, the PSS, SSS, and/or CSI-RS may correspond to a VCI associated with the base station. In another aspect, the PSS and the SSS may correspond to a PCI associated with the base station, and the CSI-RS in combination with the PCI may correspond to at least one VCI.

In another aspect, the reference signals may include a PSS, SSS, CRS, and/or CSI-RS. In an aspect, the PSS, SSS, CRS, and/or CSI-RS may correspond to a VCI associated with the base station. In another aspect, the PSS, SSS, and the CRS may correspond to a PCI associated with the base station, and the CSI-RS in combination with the PCI may correspond to at least one VCI. In an aspect, a periodicity of the CRS may be different from a periodicity of the CSI-RS.

At step 1112, the UE receives a mapping between the PCI and the at least one VCI.

At step 1114, the UE determines a VCI associated with the base station based on the received one or more reference signals.

At step 1116, the UE determines a state (e.g., ON state or OFF state) of the base station and performs a measurement of the base station depending on the state of the base station.

At step 1118, the UE determines an RSRP and/or an RSRQ based on at least one of the CRS or the CSI-RS.

At step 1120, the UE reports the RSRP and/or RSRQ to the base station.

At step 1122, the UE refrains from reporting the RSRP and/or RSRQ.

At step 1124, the UE reports CSI to the base station based on the CSI-RS.

At step 1126, the UE separately reports the RSRP, RSRQ, and/or CSI based on the first and second configurations of the CSI-RS when the first cell identifier is different from the second cell identifier.

At step 1128, the UE jointly reports the RSRP, RSRQ, and/or CSI based on the first and second configurations of the CSI-RS when the first cell identifier is same as the second cell identifier.

It should be understood that the steps 1120, 1122, 1124, 1126, and/or 1128 may be performed individually. For example, if the UE performs step 1120, the UE may not perform steps 1122, 1124, 1126, and 1128. As another example, if the UE performs steps 1122 and 1124, the UE may not perform steps 1120, 1126, and 1128.

Figure 12A:
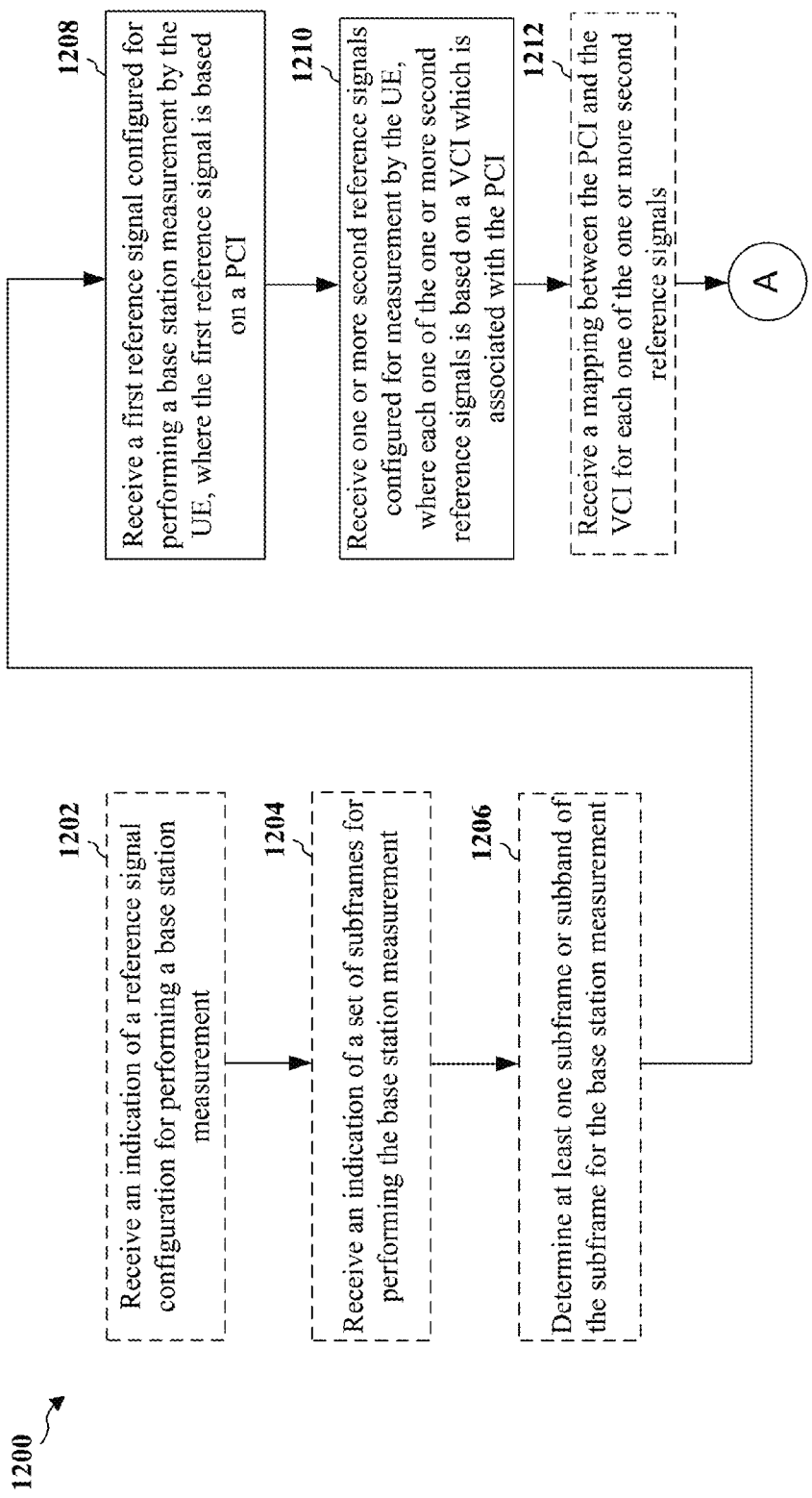
FIGS. 12A and 12B are a flow chart of a method of wireless communication.
Figure 12B:
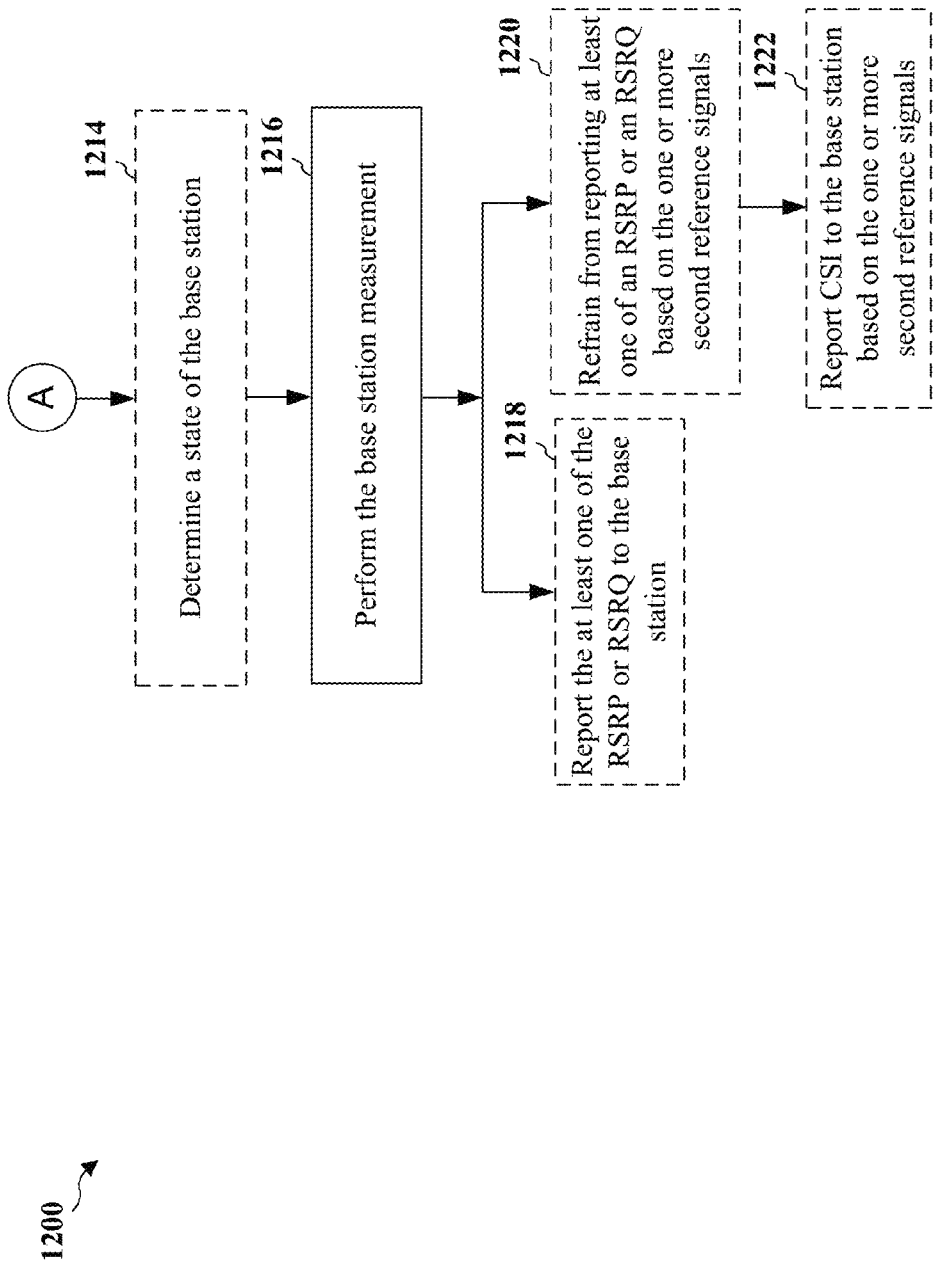

FIGS. 12A and 12B are a flow chart 1200 of a method of wireless communication. The method may be performed by a UE (e.g., the apparatus 1302/1302'). It should be understood that the steps indicated by dashed lines in flow chart 1200 represent optional steps.

At step 1202, the UE receives an indication of a reference signal configuration for performing a base station measurement. The base station measurement may operate a DRS for the base station. Furthermore, the reference signal configuration may be provided by the base station that will transmit the DRS based on the configuration, another serving base station, or broadcast within the network.

At step 1204, the UE receives an indication of a set of subframes for performing a base station measurement. In an aspect, the UE may receive the indication from a network (e.g., a cell or base station). The indication may be provided by the base station that will use the set of subframes for DRS, another serving base station, or broadcast within the network.

At step 1206, the UE determines at least one subframe or subband of the subframe for the base station measurement.

At step 1208, the UE receives a first reference signal configured for performing the base station measurement by the UE, where the first reference signal is based on a PCI. For example, the first reference signal may be PSS, SSS, or a CRS.

At step 1210, the UE receives one or more second reference signals configured for measurement by the UE, where each one of the one or more second reference signals is based on a VCI which is associated with the PCI. For example, the one or more second reference signals may be CSI-RSs. In an aspect, the VCI for each one of the one or more second reference signals is signaled from a serving base station to the UE. In an aspect, the first reference signal and the one or more second reference signals are received when the base station is in an OFF state or an ON state.

At step 1212, the UE receives a mapping between the PCI and the VCI for each one of the one or more second reference signals. Alternatively, the UE may receive an explicit indication of the VCI for each one of the one or more second reference signals At step 1214, the UE determines a state of the base station. For example, the state of the base station may be an OFF state or an ON state.

At step 1216, the UE performs the base station measurement. In an aspect, the base station measurement performed by the UE is based on the state of the base station. In an aspect, the base station measurement may include determination of an RSRP or an RSRQ based on the first reference signal and/or the one or more second reference signals. For example, the measurement of the RSRQ may include measuring an RSSI in the determined at least one subframe or subband of the subframe. In an aspect, performing the base station measurement includes determination of an RSRQ based on the at least one subframe or subband.

At step 1218, the UE reports the RSRP and/or RSRQ to the base station, or its serving base station.

At step 1220, the UE refrains from reporting the RSRP and/or RSRQ based on the one or more second reference signals.

At step 1222, the UE reports CSI to the base station, or its serving base station, based on the one or more second reference signals.

It should be understood that step 1218, and steps 1220 and 1222 may be performed individually. For example, if the UE performs step 1218, the UE may not perform steps 1220 and 1222. Different implementations may have the UE report different combinations of information.

In an aspect, the steps in which the UE receives configuration information (e.g., steps 1102 through 1106 in FIG. 11A and/or steps 1202 and 1204 in FIG. 12A) may include communications between the UE and the serving cell of the UE. For example, the serving cell of the UE may be a small cell if the small cell is in an ON state and is serving the UE. As another example, the serving cell may be a neighboring cell if the small cell is not serving the UE. In another aspect, the steps in which the UE receives configuration information may include communications that are broadcast by the network within a region and received by the UE.

In an aspect, the steps in which the UE reports measurements (e.g., steps 1120 through 1128 in FIG. 11B and/or steps 1218 and 1222 in FIG. 12B) may include reporting measurements (e.g., CSI, RSRQ, and/or RSRP) to the serving cell of the UE. For example, the serving cell may be a small cell if the small cell is in an ON state and serving the UE. As another example, the serving cell may be a neighboring cell if the small cell is not serving the UE.

Figure 13:
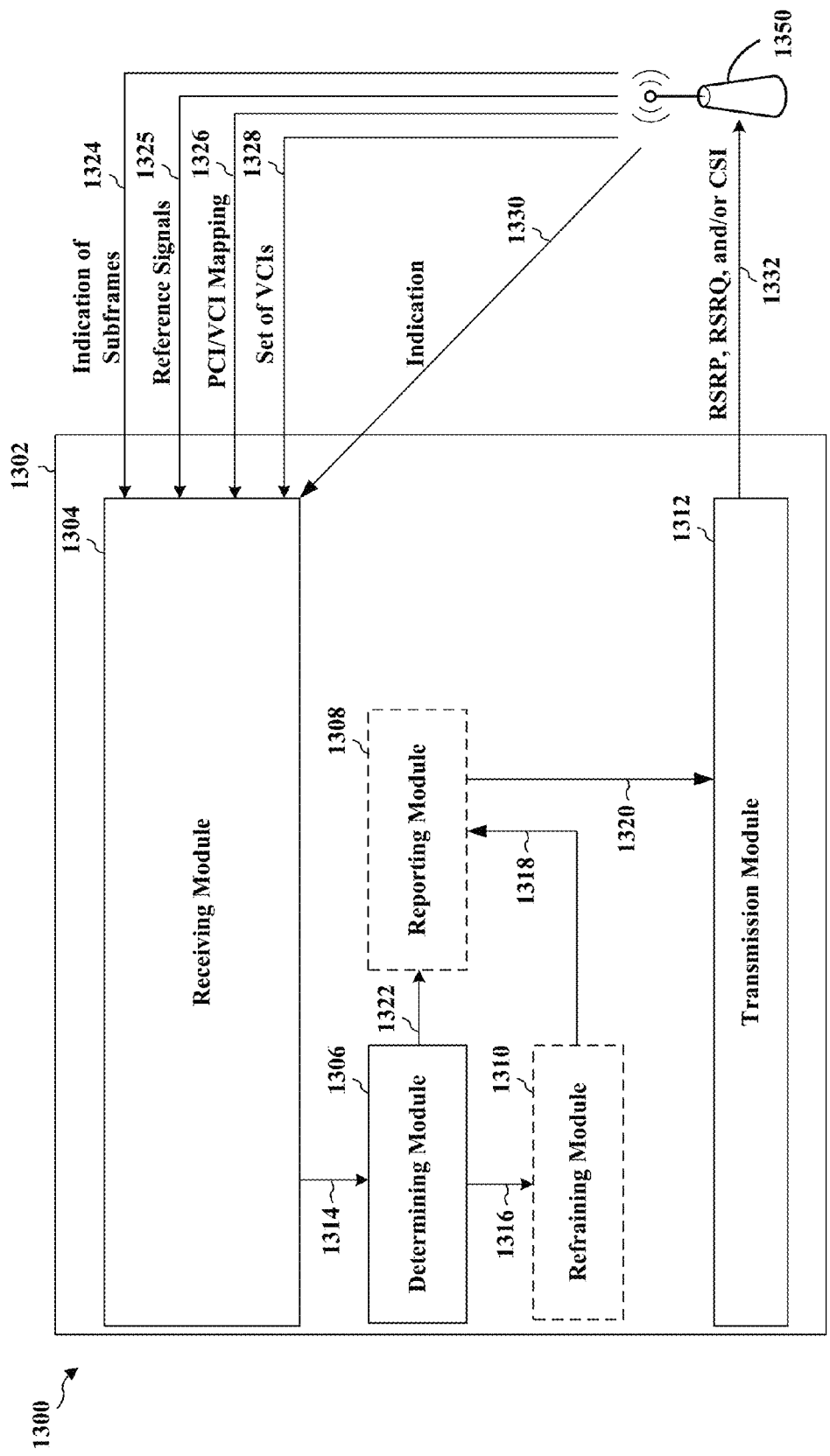
FIG. 13 is a conceptual data flow diagram illustrating the data flow between different modules/means/components in an exemplary apparatus.

FIG. 13 is a conceptual data flow diagram 1300 illustrating the data flow between different modules/means/components in an exemplary apparatus 1302. The apparatus may be a UE. The receiving module 1304 receives an indication of a set of subframes 1324 for performing measurement from a network, receives one or more reference signals 1325 configured for performing measurement of a base station by the UE, receives a mapping 1326 between the PCI and the at least one VCI, receives a set of VCIs 1328 for measurement from a network, and receives an indication 1330 of a configuration of a reference signal for performing measurement. In an aspect, the determining module 1306 receives a signal 1314 that includes one or more reference signals and determines a VCI associated with the base station based on the received one or more reference signals. In an aspect, the determining module 1306 receives a signal 1314 that includes an indication of a set of subframes and determines at least one subframe or subband of the subframe for measurement of an RSRQ. In an aspect, the determining module 1306 receives a signal 1314 that includes one or more reference signals and determines an RSRP and/or an RSRQ based on at least one of the CRS or the CSI-RS. In an aspect, the determining module 1306 determines a state of the base station 1350 and performs a measurement of the base station depending on the state of the base station. The reporting module 1308 receives the determination 1322 from the determining module 1306 and sends a reporting signal 1320. The reporting signal 1320 is received by the transmission module 1312, which sends a signal 1332 to the base station. The signal 1332 reports the RSRP and/or RSRQ to the base station, reports CSI to the base station based on the CSI-RS, separately reports an RSRP, RSRQ, and/or CSI based on the first and second configurations of the CSI-RS when the first cell identifier is different from the second cell identifier, or jointly reports the RSRP, RSRQ, and/or CSI based on the first and second configurations of the CSI-RS when the first cell identifier is same as the second cell identifier. The refraining module 1310 receives a determination 1316 from the determining module 1306 and provides a refraining signal 1318 that causes the reporting module 1308 to refrain from reporting the RSRP and/or an RSRQ.

In an aspect, the base station 1350 may be the serving cell of the UE. For example, the serving cell of the UE may be a small cell if the small cell is in an ON state and is serving the UE. As another example, the serving cell may be a neighboring cell if the small cell is not serving the UE. In another aspect, the receiving module 1304 may be configured to receive configuration information (e.g., indication of subframes 1324, set of VCIs 1328) in a broadcast from a network.

In an aspect, the reporting module 1308 may report measurements (e.g., signal 1332) that may include reporting measurements (e.g., CSI, RSRQ, and/or RSRP) to the serving cell (e.g., base station 1350) of the UE. For example, the serving cell may be a small cell if the small cell is in an ON state and serving the UE. As another example, the serving cell may be a neighboring cell (not shown in FIG. 13) if the small cell is not serving the UE.

The apparatus may include additional modules that perform each of the steps of the algorithm in the aforementioned flow charts of FIGS. 11A, 11B and FIGS. 12A, 12B. As such, each step in the aforementioned flow charts of FIGS. 11A, 11B and FIGS. 12A, 12B may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 14:
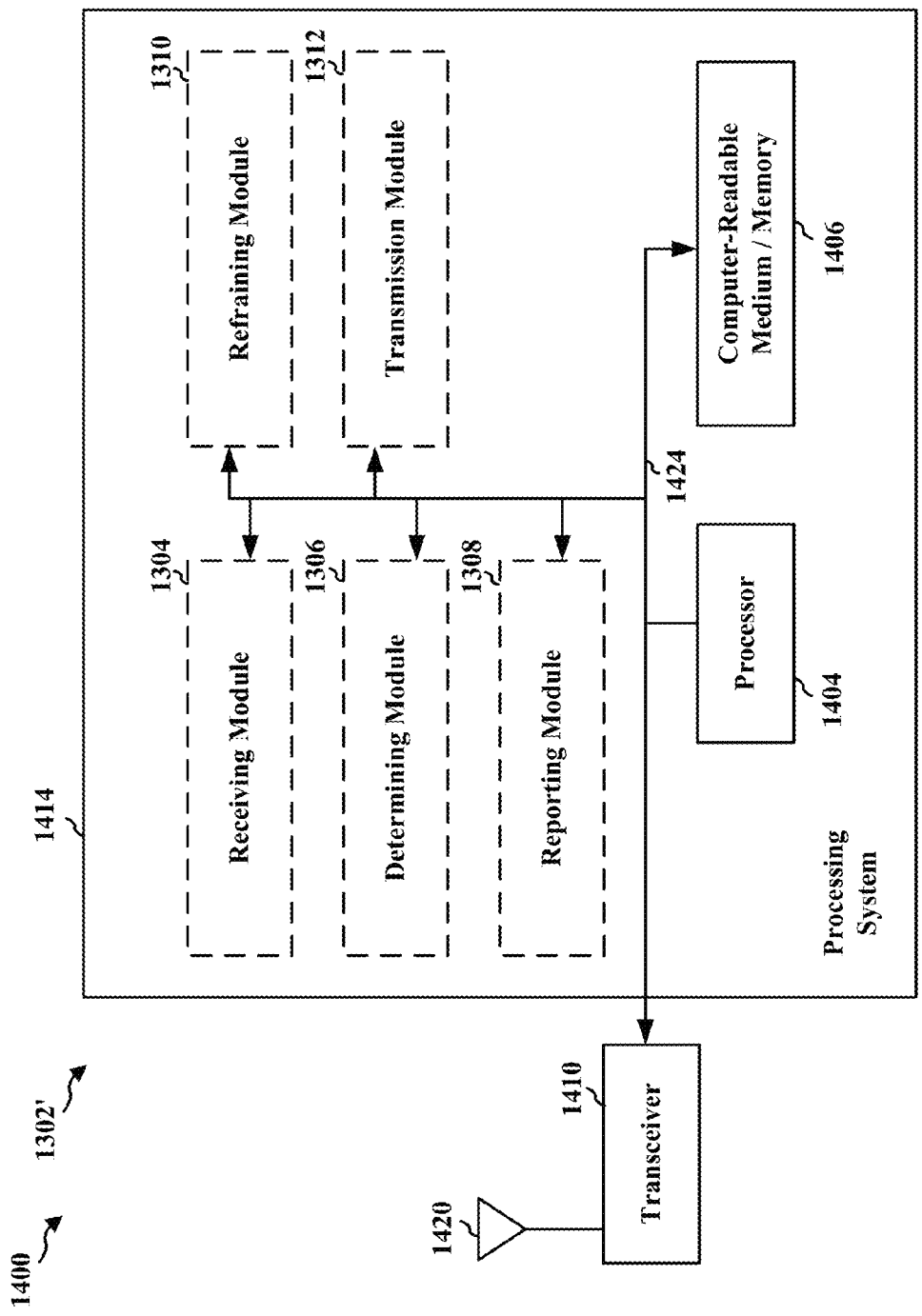
FIG. 14 is a diagram illustrating an example of a hardware implementation for an apparatus employing a processing system.

FIG. 14 is a diagram 1400 illustrating an example of a hardware implementation for an apparatus 1302' employing a processing system 1414. The processing system 1414 may be implemented with a bus architecture, represented generally by the bus 1424. The bus 1424 may include any number of interconnecting buses and bridges depending on the specific application of the processing system 1414 and the overall design constraints. The bus 1424 links together various circuits including one or more processors and/or hardware modules, represented by the processor 1404, the modules 1304, 1306, 1308, 1310, and 1312, and the computer-readable medium/memory 1406. The bus 1424 may also link various other circuits such as timing sources, peripherals, voltage regulators, and power management circuits, which are well known in the art, and therefore, will not be described any further.

The processing system 1414 may be coupled to a transceiver 1410. The transceiver 1410 is coupled to one or more antennas 1420. The transceiver 1410 provides a means for communicating with various other apparatus over a transmission medium. The transceiver 1410 receives a signal from the one or more antennas 1420, extracts information from the received signal, and provides the extracted information to the processing system 1414, specifically the reception module 1304. In addition, the transceiver 1410 receives information from the processing system 1414, specifically the transmission module 1312, and based on the received information, generates a signal to be applied to the one or more antennas 1420. The processing system 1414 includes a processor 1404 coupled to a computer-readable medium/memory 1406. The processor 1404 is responsible for general processing, including the execution of software stored on the computer-readable medium/memory 1406. The software, when executed by the processor 1404, causes the processing system 1414 to perform the various functions described supra for any particular apparatus. The computer-readable medium/memory 1406 may also be used for storing data that is manipulated by the processor 1404 when executing software. The processing system further includes at least one of the modules 1304, 1306, 1308, 1310, and 1312. The modules may be software modules running in the processor 1404, resident/stored in the computer readable medium/memory 1406, one or more hardware modules coupled to the processor 1404, or some combination thereof. The processing system 1414 may be a component of the UE 650 and may include the memory 660 and/or at least one of the TX processor 668, the RX processor 656, and the controller/processor 659.

In one configuration, the apparatus 1302/1302' for wireless communication includes means for receiving one or more reference signals configured for performing measurement of a base station by the UE, means for determining a VCI associated with the base station based on the received one or more reference signals, means for receiving a mapping between the PCI and the at least one VCI, means for determining an RSRP and/or an RSRQ based on at least one of the CRS or the CSI-RS, means for reporting the RSRP and/or RSRQ to the base station, means for refraining from reporting an RSRP and/or an RSRQ, means for reporting CSI to the base station based on the CSI-RS, means for determining a state of the base station and performing a measurement of the base station depending on the state of the base station, wherein the state of the station comprises an OFF state or an ON state, means for separately reporting an RSRP, RSRQ, and/or CSI based on the first and second configurations of the CSI-RS when the first cell identifier is different from the second cell identifier, means for jointly reporting the RSRP, RSRQ, and/or CSI based on the first and second configurations of the CSI-RS when the first cell identifier is same as the second cell identifier, means for determining at least one subframe or subband of the subframe for measurement of an RSRQ, means for receiving a set of VCIs for measurement from a network, means for receiving an indication of a set of subframes for performing measurement from a network, means for receiving an indication of a configuration of a reference signal for performing measurement. The aforementioned means may be one or more of the aforementioned modules of the apparatus 1302 and/or the processing system 1414 of the apparatus 1302' configured to perform the functions recited by the aforementioned means. As described supra, the processing system 1414 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

Figure 15A:
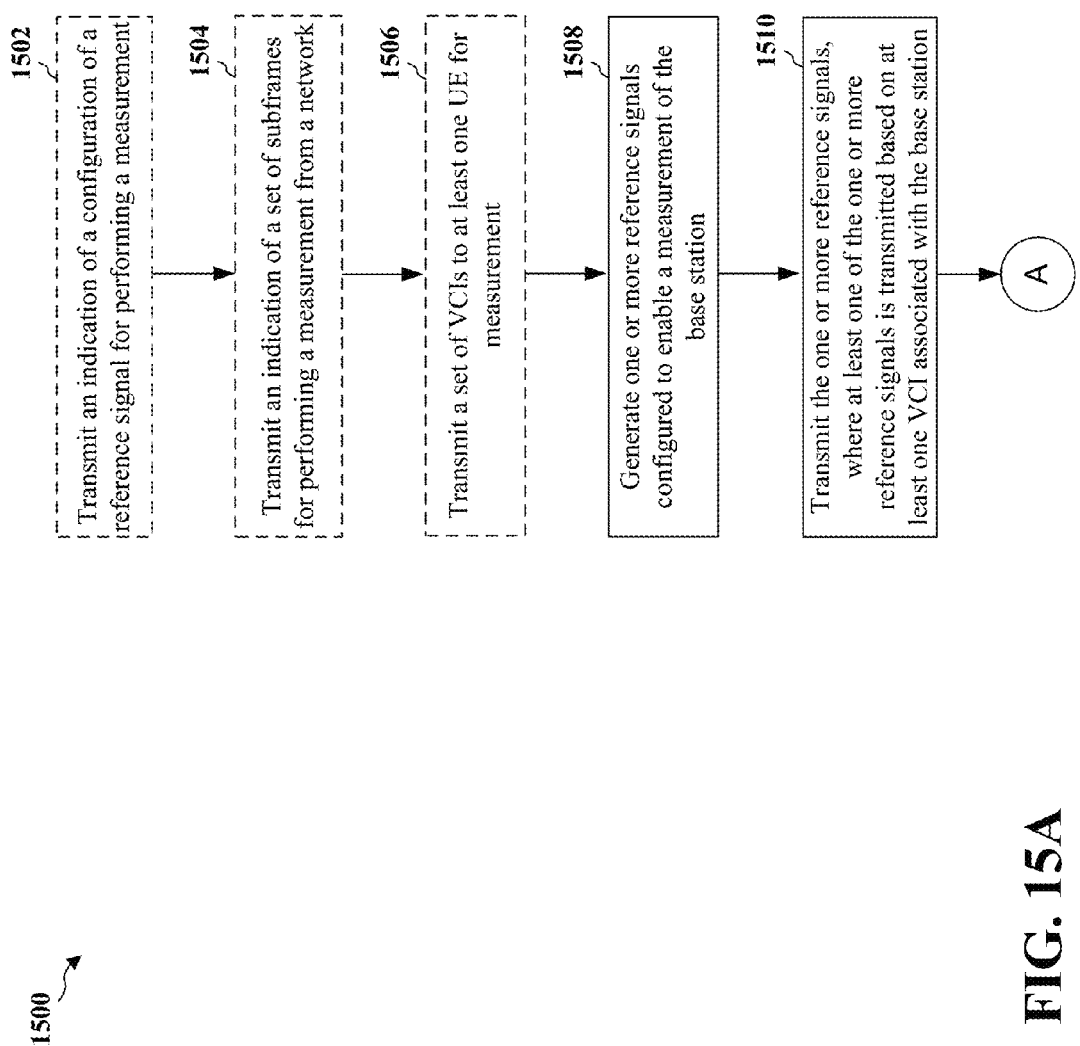
FIGS. 15A and 15B are a flow chart of a method of wireless communication.
Figure 15B:
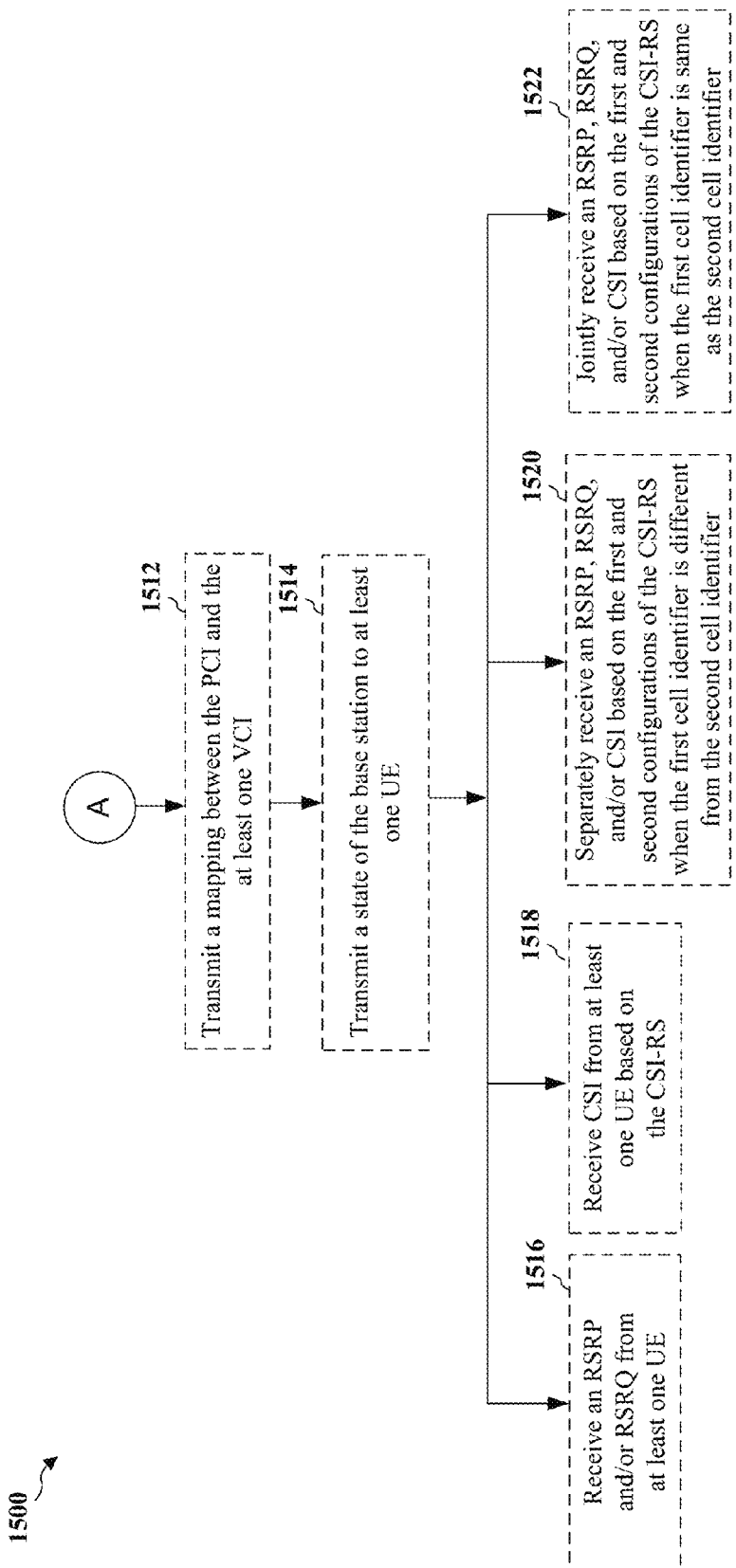

FIGS. 15A and 15B are a flow chart 1500 of a method of wireless communication. The method may be performed by a base station (e.g., the apparatus 1702/1702'). It should be understood that the steps indicated by dashed lines in flow chart 1500 represent optional steps.

At step 1502, the base station transmits an indication of a configuration of a reference signal for performing a measurement by at least one UE.

At step 1504, the base station transmits an indication of a set of subframes to at least one UE for performing a measurement by the at least one UE.

At step 1506, the base station transmits a set of VCIs to at least one UE for measurement by the at least one UE.

At step 1508, the base station generates one or more reference signals configured to enable at least one UE to perform a measurement of the base station.

At step 1510, the base station transmits one or more reference signals, where at least one of the one or more reference signals is transmitted based on at least one VCI associated with the base station. In an aspect, the reference signals may include a PSS, SSS, and/or CRS. In an aspect, the PSS, SSS, and/or CRS may correspond to a VCI associated with the base station. In another aspect, the PSS and the SSS may correspond to a PCI associated with the base station, and the CRS in combination with the PCI may correspond to at least one VCI.

In another aspect, the reference signals may include a PSS, SSS, and/or CSI-RS. In an aspect, the PSS, SSS, and/or CSI-RS may correspond to a VCI associated with the base station. In another aspect, the PSS and the SSS may correspond to a PCI associated with the base station, and the CSI-RS in combination with the PCI may correspond to at least one VCI.

In another aspect, the reference signals may include a PSS, SSS, CRS, and/or CSI-RS. In an aspect, the PSS, SSS, CRS, and/or CSI-RS may correspond to a VCI associated with the base station. In another aspect, the PSS, SSS, and the CRS may correspond to a PCI associated with the base station, and the CSI-RS in combination with the PCI may correspond to at least one VCI. In an aspect, a periodicity of the CRS may be different from a periodicity of the CSI-RS.

At step 1512, the base station transmits a mapping between the PCI and the at least one VCI.

At step 1514, the base station transmits a state (e.g., ON state or OFF state) of the base station to at least one UE.

At step 1516, the base station receives an RSRP and/or RSRQ from at least one UE.

At step 1518, the base station receives CSI from at least one UE based on the CSI-RS.

At step 1520, the base station separately receives the RSRP, RSRQ, and/or CSI based on the first and second configurations of the CSI-RS when the first cell identifier is different from the second cell identifier.

At step 1522, the base station jointly receives the RSRP, RSRQ, and/or CSI based on the first and second configurations of the CSI-RS when the first cell identifier is same as the second cell identifier.

It should be understood that the steps 1516, 1518, 1520, and/or 1522 may be performed individually. For example, if the base station performs step 1516, the base station may not perform steps 1518, 1520, and 1522.

Figure 16A:
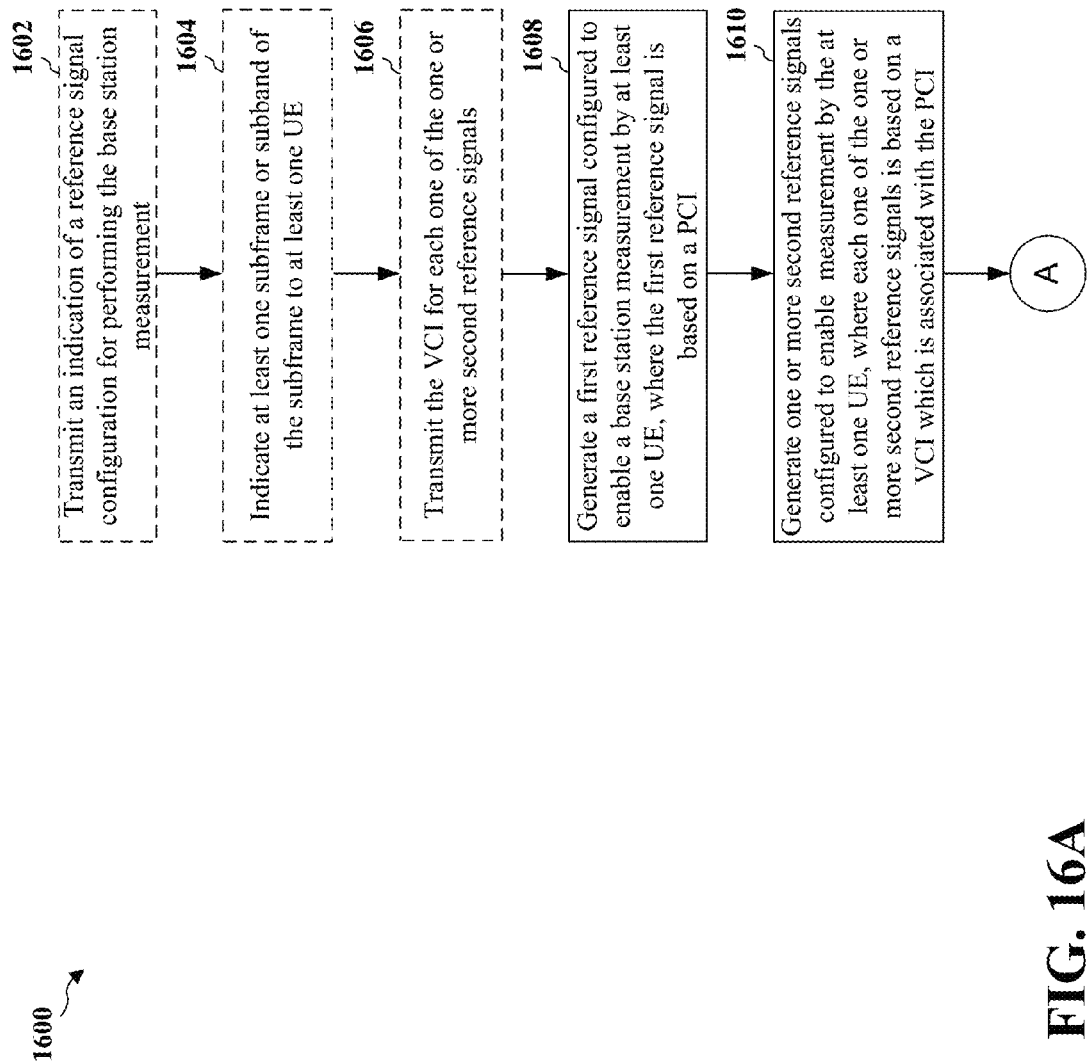
FIGS. 16A and 16B are a flow chart of a method of wireless communication.
Figure 16B:
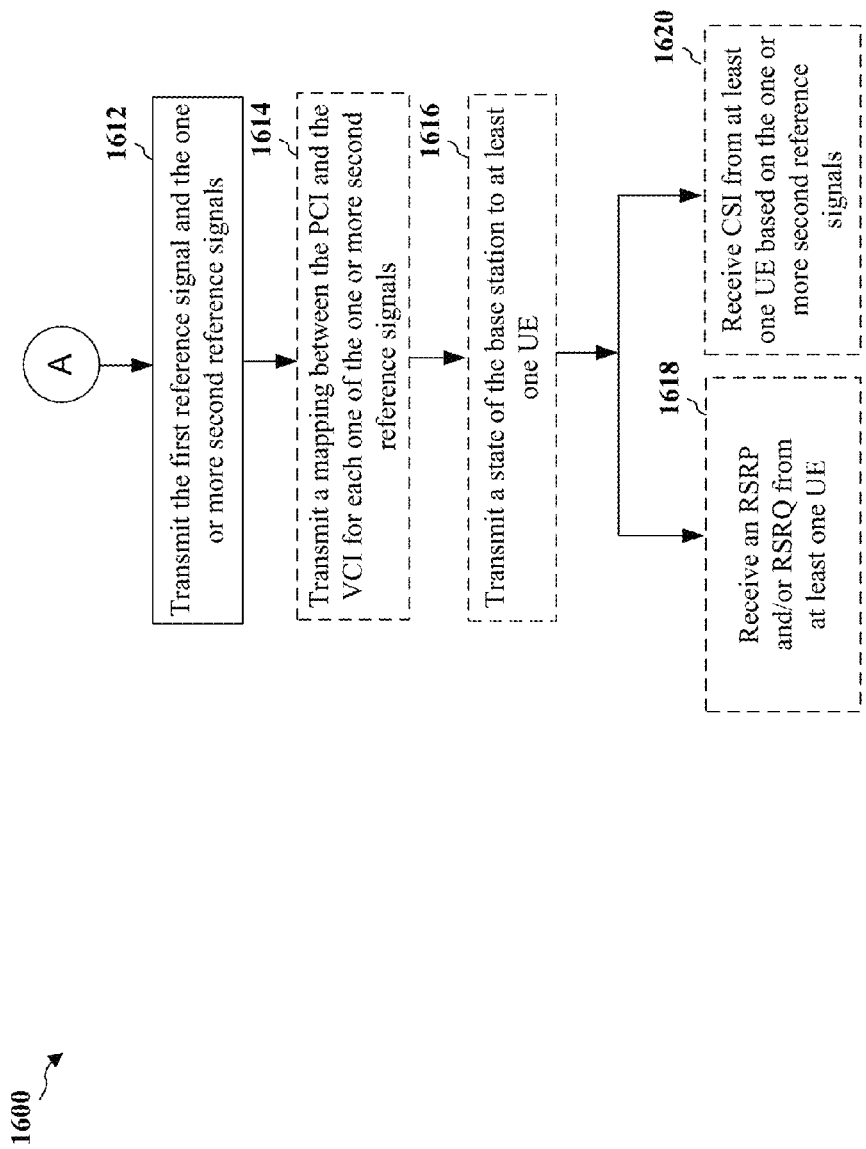

FIGS. 16A and 16B are a flow chart 1600 of a method of wireless communication. The method may be performed by a base station (e.g., the apparatus 1702/1702'). It should be understood that the steps indicated by dashed lines in flow chart 1600 represent optional steps.

At step 1602, the base station transmits an indication of a reference signal configuration for performing the base station measurement. In an aspect, the reference signal configuration identifies at least one of a CRS or a CSI-RS.

At step 1604, the base station indicates at least one subframe or subband of the subframe to at least one UE.

At step 1606, the base station transmits the VCI for each one of one or more second reference signals.

At step 1608, the base station generates a first reference signal configured to enable a base station measurement by at least one UE, where the first reference signal is based on a PCI. In an aspect, the first reference signal may be PSS, SSS, and/or a CRS.

At step 1610, the base station generates one or more second reference signals configured to enable measurement by the at least one UE, where each one of the one or more second reference signals is based on a VCI which is associated with the PCI. In an aspect, each one of the one or more second reference signals may be a CSI-RS.

At step 1612, the base station transmits the first reference signal and the one or more second reference signals.

At step 1614, the base station transmits a state of the base station to at least one UE. For example, the state of the base station may be an OFF state or an ON state. In an aspect, the first reference signal and the one or more second reference signals are transmitted when the base station is in the OFF state or the ON state.

At step 1616, the base station receives an RSRP and/or RSRQ from at least one UE. In an aspect, the RSRQ is based on an RSSI in the at least one subframe or subband of the subframe.

At step 1618, the base station receives CSI from at least one UE based on the one or more second reference signals.

It should be understood that the steps 1618 and 1620 may be performed individually. For example, if the base station performs step 1618, the base station may not perform step 1620.

In an aspect, the steps in which the base station transmits configuration information (e.g., steps 1502 through 1506 in FIG. 15A, and/or steps 1602 through 1606 in FIG. 16A) may include communications between the base station and a UE being served by the base station. For example, the base station may be a small cell if the small cell is in an ON state and is serving the UE. As another example, the base station may be a neighboring cell if the small cell is not serving the UE. In another aspect, the steps in which the base station transmits configuration information may include communications that are broadcast by the base station.

In an aspect, the steps in which the base station receives measurements reported by a UE (e.g., steps 1516 through 1522 in FIG. 15B and/or steps 1618 and 1620 in FIG. 16B) may include receiving measurements (e.g., CSI, RSRQ, and/or RSRP) from a UE at a base station that is the serving cell of the UE. For example, the serving cell may be a small cell if the small cell is in an ON state and serving the UE. As another example, the serving cell may be a neighboring cell if the small cell is not serving the UE.

Figure 17:
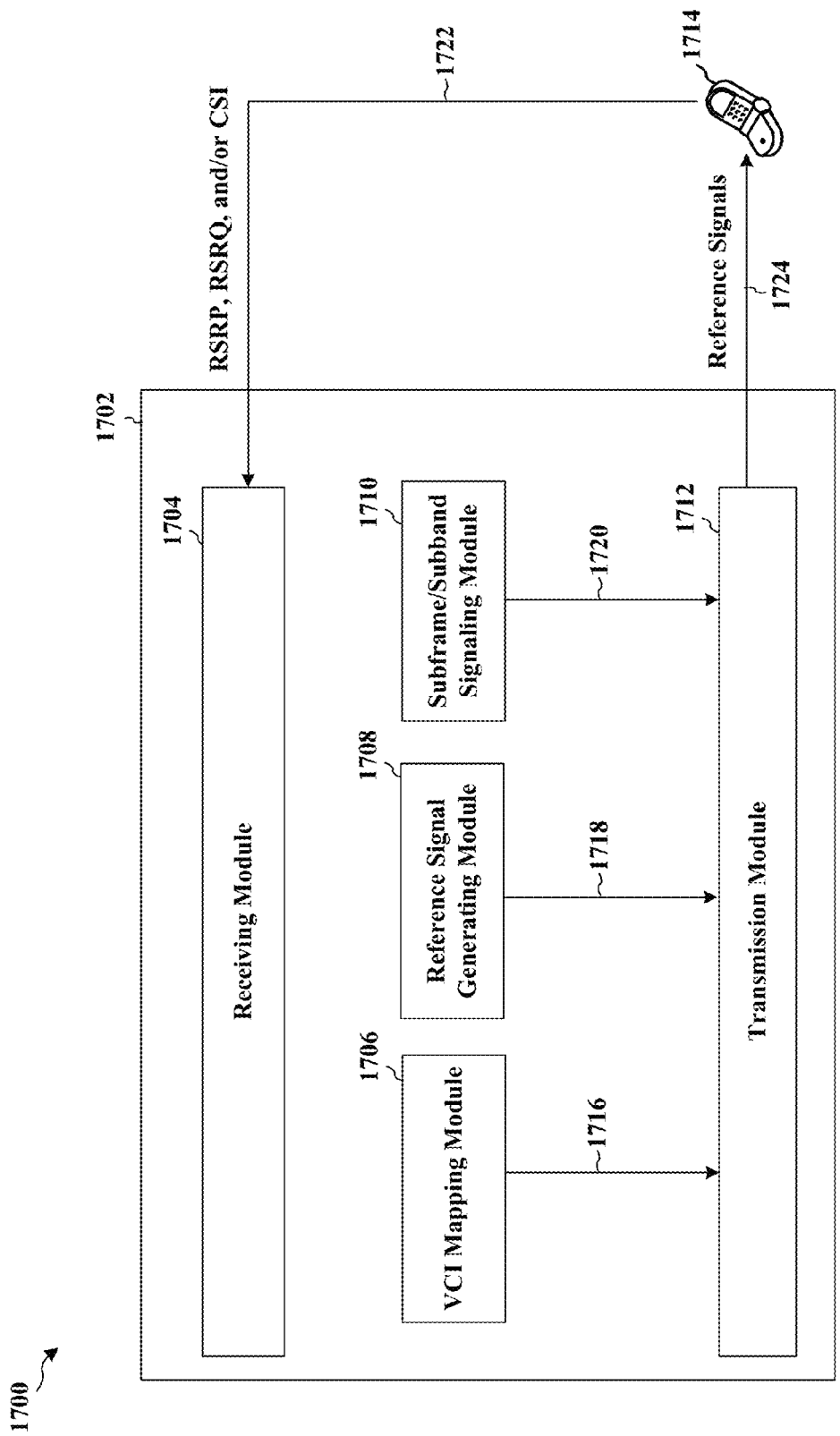
FIG. 17 is a conceptual data flow diagram illustrating the data flow between different modules/means/components in an exemplary apparatus.

FIG. 17 is a conceptual data flow diagram 1700 illustrating the data flow between different modules/means/components in an exemplary apparatus 1702. The apparatus may be a base station. Receiving module 1704 receives one or more uplink signals 1722 from the UE 1714. In an aspect, receiving module 1704 receives an RSRP and/or RSRQ from a UE based on at least one of the CRS or the CSI-RS, receives CSI from a UE based on the CSI-RS, separately receives an RSRP, RSRQ, and/or CSI based on the first and second configurations of the CSI-RS when the first cell identifier is different from the second cell identifier, and jointly receives the RSRP, RSRQ, and/or CSI based on the first and second configurations of the CSI-RS when the first cell identifier is same as the second cell identifier. The VCI mapping module 1706 transmits, via the transmission module 1712, a mapping 1716 between the PCI and at least one VCI. The reference signal generating module 1708 generates one or more reference signals 1718 configured to enable a measurement of the base station by at least one UE. For example, the reference signals 1718 are transmitted to the UE 1714 via one or more downlink signals 1724. The subframe/subband signaling module 1710 signals, to at least one UE, at least one subframe or subband 1720 of the subframe for measurement of an RSRQ, where the at least one subframe or subband of the subframe does not include the one or more reference signals configured for discovery. The transmission module 1712 transmits the one or more reference signals via one or more downlink signals 1724, where at least one of the one or more reference signals is transmitted based on at least one VCI associated with the base station, transmits a set of VCIs for measurement by at least one UE, transmits an indication of a set of subframes for performing a measurement by at least one UE, and transmits an indication of a configuration of a reference signal for measurement by at least one UE, where the reference signal is a CRS and/or a CSI-RS.

In an aspect, the VCI mapping module 1706 and/or subframe/subband signaling module 1710 of the base station may transmit configuration information (e.g., via downlink signals 1724) to the UE 1714. In one example, the base station may be a small cell if the small cell is in an ON state and is serving the UE 1714. In another example, the base station may be a neighboring cell if the small cell is not serving the UE 1714. In another aspect, the VCI mapping module 1706 and/or subframe/subband signaling module 1710 of the base station may broadcast the configuration information.

In an aspect, the base station (e.g., apparatus 1702) may be serving cell of the UE 1714 and the receiving module 1704 may be configured to receive measurements (e.g., CSI, RSRQ, and/or RSRP) reported by a UE 1714 (e.g., via uplink signals 1722). In one example, the serving cell may be a small cell if the small cell is in an ON state and serving the UE 1714. In another example, the serving cell may be a neighboring cell if the small cell is not serving the UE 1714.

The apparatus may include additional modules that perform each of the steps of the algorithm in the aforementioned flow chart of FIGS. 14A and 14B. As such, each step in the aforementioned flow chart of FIGS. 14A and 14B may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 18:
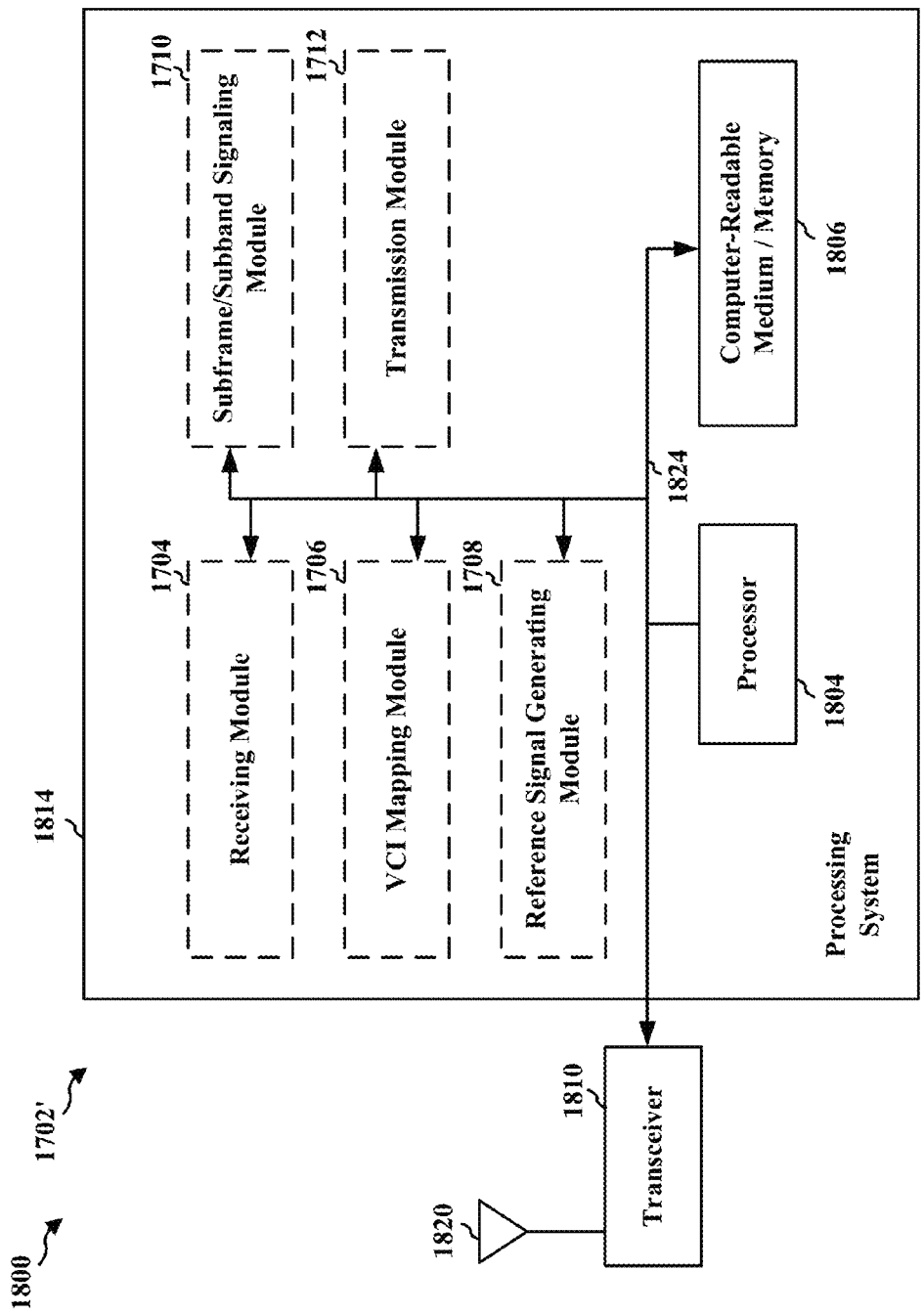
FIG. 18 is a diagram illustrating an example of a hardware implementation for an apparatus employing a processing system.

FIG. 18 is a diagram 1800 illustrating an example of a hardware implementation for an apparatus 1702' employing a processing system 1814. The processing system 1814 may be implemented with a bus architecture, represented generally by the bus 1824. The bus 1824 may include any number of interconnecting buses and bridges depending on the specific application of the processing system 1814 and the overall design constraints. The bus 1824 links together various circuits including one or more processors and/or hardware modules, represented by the processor 1804, the modules 1704, 1706, 1708, 1710, and 1712, and the computer-readable medium/memory 1806. The bus 1824 may also link various other circuits such as timing sources, peripherals, voltage regulators, and power management circuits, which are well known in the art, and therefore, will not be described any further.

The processing system 1814 may be coupled to a transceiver 1810. The transceiver 1810 is coupled to one or more antennas 1820. The transceiver 1810 provides a means for communicating with various other apparatus over a transmission medium. The transceiver 1810 receives a signal from the one or more antennas 1820, extracts information from the received signal, and provides the extracted information to the processing system 1814, specifically the reception module 1704. In addition, the transceiver 1810 receives information from the processing system 1814, specifically the transmission module 1712, and based on the received information, generates a signal to be applied to the one or more antennas 1820. The processing system 1814 includes a processor 1804 coupled to a computer-readable medium/memory 1806. The processor 1804 is responsible for general processing, including the execution of software stored on the computer-readable medium/memory 1806. The software, when executed by the processor 1804, causes the processing system 1814 to perform the various functions described supra for any particular apparatus. The computer-readable medium/memory 1806 may also be used for storing data that is manipulated by the processor 1804 when executing software. The processing system further includes at least one of the modules 1704, 1706, 1708, 1710, and 1712. The modules may be software modules running in the processor 1804, resident/stored in the computer readable medium/memory 1806, one or more hardware modules coupled to the processor 1804, or some combination thereof. The processing system 1814 may be a component of the eNB 610 and may include the memory 676 and/or at least one of the TX processor 616, the RX processor 670, and the controller/processor 675.

In one configuration, the apparatus 1702/1702' for wireless communication includes means for generating one or more reference signals configured to enable a measurement of the base station, means for transmitting the one or more reference signals, where at least one of the one or more signals is transmitted based on at least one VCI associated with the base station, means for transmitting a mapping between the PCI and the at least one VCI, means for receiving an RSRP and/or an RSRQ from a UE based on at least one of the CRS or the CSI-RS, means for receiving CSI from a UE based on the CSI-RS, means for separately receiving an RSRP, RSRQ, and/or CSI based on the first and second configurations of the CSI-RS when the first cell identifier is different from the second cell identifier, means for jointly receiving the RSRP, RSRQ, and/or CSI based on the first and second configurations of the CSI-RS when the first cell identifier is same as the second cell identifier, means for signaling, to a UE, at least one subframe or subband of the subframe for measurement of an RSRQ, where the at least one subframe or subband of the subframe does not include the one or more reference signals configured for discovery, means for transmitting a set of VCIs for measurement by at least one UE, means for transmitting an indication of a set of subframes for performing a measurement by at least one UE, and means for transmitting an indication of a configuration of a reference signal for measurement by at least one UE, where the reference signal is a CRS and/or a CSI-RS.

The aforementioned means may be one or more of the aforementioned modules of the apparatus 1702 and/or the processing system 1814 of the apparatus 1702' configured to perform the functions recited by the aforementioned means. As described supra, the processing system 1814 may include the TX Processor 616, the RX Processor 670, and the controller/processor 675. As such, in one configuration, the aforementioned means may be the TX Processor 616, the RX Processor 670, and the controller/processor 675 configured to perform the functions recited by the aforementioned means.

It is understood that the specific order or hierarchy of steps in the processes/flow charts disclosed is an illustration of exemplary approaches. Based upon design preferences, it is understood that the specific order or hierarchy of steps in the processes/flow charts may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication for a user equipment (UE), comprising:
receiving, from a cell, a first reference signal configured for performing a measurement by the UE, where the first reference signal is based on a physical cell identifier (PCI) or a virtual cell identifier (VCI);
receiving, from the cell, one or more second reference signals configured for measurement by the UE, where each one of the one or more second reference signals is based, respectively, on one VCI from among one or more VCI; and
performing the measurement based on the first reference signal and the one or more second reference signals,
wherein the VCI and the one or more VCI are associated with the PCI.

2. The method of claim 1, wherein the one VCI associated with each one of the one or more second reference signals is signaled from a serving base station to the UE.

3. The method of claim 1, wherein the first reference signal comprises at least one of a primary synchronization signal (PSS), a secondary synchronization signal (SSS), or a cell-specific reference signal (CRS).

4. The method of claim 1, where each one of the one or more second reference signals comprises a channel state information reference signal (CSI-RS).

5. The method of claim 1, wherein the first reference signal and the one or more second reference signals are received when a serving base station is in an OFF state or an ON state.

6. The method of claim 1, further comprising receiving a mapping between the PCI and the one VCI associated with each one of the one or more second reference signals.

7. The method of claim 1, wherein performing the measurement comprises determining at least one of a reference signal received power (RSRP) or a reference signal received quality (RSRQ) based on at least one of the first reference signal and the one or more second reference signals.

8. The method of claim 7, further comprising reporting the at least one of the RSRP or RSRQ to a serving base station.

9. The method of claim 7, further comprising:
refraining from reporting at least one of the RSRP or RSRQ based on the one or more second reference signals.

10. The method of claim 9, further comprising:
reporting channel state information (CSI) to a serving base station based on the one or more second reference signals.

11. The method of claim 1, further comprising:
determining a state of a serving base station,
wherein the measurement is based on the state of the serving base station, wherein the state of the base station comprises an OFF state or an ON state.

12. The method of claim 1, further comprising determining at least one subframe or subband of the subframe,
wherein performing the measurement includes determining a reference signal received quality (RSRQ) based on the at least one subframe or subband.

13. The method of claim 12, wherein the measurement of the RSRQ comprises measuring a received signal strength indicator (RSSI) in the determined at least one subframe or subband of the subframe.

14. The method of claim 1, further comprising receiving an indication of a set of subframes for performing measurement from a network.

15. The method of claim 1, further comprising receiving an indication of a reference signal configuration for performing the measurement, wherein the reference signal configuration identifies at least one of a cell-specific reference signal (CRS) or a channel state information reference signal (CSI-RS).

16. The method of claim 1, wherein the first reference signal comprises at least one of a primary synchronization signal (PSS) based on the PCI, and a secondary synchronization signal (SSS) based on the PCI, and the one or more second reference signals comprises a channel state information reference signal (CSI-RS) based on the PCI.

17. The method of claim 16, further comprising:
receiving a cell-specific reference signal (CRS) from the cell; and
performing the measurement based on the first reference signal, the one or more second reference signals, and the CRS.

18. The method of claim 17, wherein the CRS is based on the PCI.

19. A UE for wireless communication, comprising:
a memory; and
at least one processor coupled to the memory and configured to:
receive, from a cell, a first reference signal configured for performing a measurement by the UE, where the first reference signal is based on a physical cell identifier (PCI) or a virtual cell identifier (VCI);
receive, from the cell, one or more second reference signals configured for measurement by the UE, where each one of the one or more second reference signals is based, respectively, on one VCI from among one or more VCI; and
perform the measurement based on the first reference signal and the one or more second reference signals,
wherein the VCI and the one or more VCI are associated with the PCI.

20. A method of wireless communication for a base station, comprising:
generating a first reference signal configured to enable a measurement by at least one user equipment (UE), where the first reference signal is based on a physical cell identifier (PCI) or a virtual cell identifier (VCI);
generating one or more second reference signals configured to enable measurement by the at least one UE, where each one of the one or more second reference signals is based, respectively, on one VCI from among one or more VCI; and
transmitting the first reference signal and the one or more second reference signals,
wherein the VCI and the one or more VCI are associated with the PCI.

21. The method of claim 20, further comprising transmitting the VCI for each one of the one or more second reference signals.

22. The method of claim 20, wherein the first reference signal comprises at least one of a primary synchronization signal (PSS), a secondary synchronization signal (SSS), or a cell-specific reference signal (CRS).

23. The method of claim 20, where each one of the one or more second reference signals comprises a channel state information reference signal (CSI-RS).

24. The method of claim 20, wherein the first reference signal and the one or more second reference signals are transmitted when a serving base station is in an OFF state or an ON state.

25. The method of claim 20, further comprising transmitting a mapping between the PCI and the VCI for each one of the one or more second reference signals.

26. The method of claim 20, further comprising:
receiving, from at least one user equipment (UE), at least one of a reference signal received power (RSRP) or a reference signal received quality (RSRQ) from the at least one UE.

27. The method of claim 26, further comprising indicating at least one subframe or subband of the subframe to at least one user equipment (UE),
wherein the RSRQ is based on the at least one subframe or subband.

28. The method of claim 26, wherein the RSRQ is based on a received signal strength indicator (RSSI) in the at least one subframe or subband of the subframe.

29. The method of claim 20 further comprising:
receiving, from at least one user equipment (UE), channel state information (CSI) based on the one or more second reference signals.

30. The method of claim 20, further comprising:
transmitting a state of a serving base station,
wherein the base station measurement is based on the state of a serving base station, wherein the state of the base station comprises an OFF state or an ON state.

31. The method of claim 20, further comprising transmitting an indication of a reference signal configuration for performing the measurement, wherein the reference signal configuration identifies at least one of a cell-specific reference signal (CRS) or a channel state information reference signal (CSI-RS).

32. An apparatus for wireless communication, comprising:
a memory; and
at least one processor coupled to the memory and configured to:
generate a first reference signal configured to enable a measurement by at least one user equipment (UE), where the first reference signal is based on a physical cell identifier (PCI) or a virtual cell identifier (VCI);
generate one or more second reference signals configured to enable measurement by the at least one UE, where each one of the one or more second reference signals is based, respectively, on one VCI from among one or more VCI; and
transmit the first reference signal and the one or more second reference signals,
wherein the VCI and the one or more VCI are associated with the PCI.

33. The apparatus of claim 32, where each one of the one or more second reference signals comprises a channel state information reference signal (CSI-RS).

* * * * *